United States Patent
Nagatomi et al.

(10) Patent No.: US 7,476,336 B2
(45) Date of Patent: Jan. 13, 2009

(54) PHOSPHOR AND MANUFACTURING METHOD FOR THE SAME, AND LIGHT EMITTING DEVICE USING THE PHOSPHOR

(75) Inventors: Akira Nagatomi, Tokyo (JP); Tetsuya Ikuta, Tokyo (JP); Shuji Yamashita, Tokyo (JP)

(73) Assignee: DOWA Electronics Materials Co., Ltd., Tokyo (JP)

( * ) Notice: Subject to any disclaimer, the term of this patent is extended or adjusted under 35 U.S.C. 154(b) by 294 days.

(21) Appl. No.: 11/149,317

(22) Filed: Jun. 10, 2005

(65) Prior Publication Data

US 2006/0244356 A1    Nov. 2, 2006

(30) Foreign Application Priority Data

Apr. 28, 2005    (JP) .............................. 2005-133606

(51) Int. Cl.
  *C09K 11/59*    (2006.01)
  *C09K 11/64*    (2006.01)

(52) U.S. Cl. ................ 252/301.4 F; 313/503; 257/98

(58) Field of Classification Search ........... 252/301.4 F, 252/301.6 F, 301.4 R, 301.6 R; 313/503; 257/98

See application file for complete search history.

(56) References Cited

U.S. PATENT DOCUMENTS

| 18,985 | A | 12/1857 | Olds |
|---|---|---|---|
| 2,121,275 | A | 6/1938 | Zober et al. |
| 3,527,595 | A | 9/1970 | Adler et al. |
| 3,697,301 | A | 10/1972 | Donofrio et al. |
| 4,477,689 | A | 10/1984 | Ogasahara et al. |
| 4,576,736 | A | 3/1986 | Harmuth |
| 5,398,398 | A | 3/1995 | Williams et al. |
| 5,447,291 | A | 9/1995 | Sandhage |
| 5,600,202 | A | 2/1997 | Yamada et al. |
| 6,180,029 | B1 | 1/2001 | Hampden-Smith et al. |
| 6,504,297 | B1 | 1/2003 | Heo et al. |
| 6,670,748 | B2 | 12/2003 | Ellens et al. |
| 7,138,756 | B2 | 11/2006 | Gotoh et al. |
| 2002/0043926 | A1 | 4/2002 | Takahashi et al. |
| 2003/0030038 | A1 | 2/2003 | Mitomo et al. |

(Continued)

FOREIGN PATENT DOCUMENTS

EP    0 459 156 A2    4/1991

(Continued)

OTHER PUBLICATIONS

JIS Z 8726; "Method of Specifying Colour Rendering Properties of Light Sources"; (1990), pp. 381-390.

(Continued)

*Primary Examiner*—C. Melissa Koslow
(74) *Attorney, Agent, or Firm*—Oliff & Berridge, PLC

(57) ABSTRACT

To provide a phosphor having an emission spectrum with a broad peak in range from green color to red color, and having excellent emission efficiency and luminance. A phosphor is provided, which is given by a general composition formula expressed by $M_mA_aB_bO_oN_n:Z$, (where element M is more than one kind of element having bivalent valency, element A is more than one kind of element having tervalent valency, element B is more than one kind of element having tetravalent valency, O is oxygen, N is nitrogen, and element Z is more than one kind of element acting as an activator.), satisfying $2.5<(a+b)/m<4.5$, $0<a/m<2.0$, $2.0<b/m<4.0$, $0<o/m<1.0$, $o<n$, $n=2/3m+a+4/3b-2/3o$.

15 Claims, 10 Drawing Sheets

U.S. PATENT DOCUMENTS

| | | |
|---|---|---|
| 2003/0030368 A1 | 2/2003 | Ellens et al. |
| 2003/0094893 A1 | 5/2003 | Ellens et al. |
| 2003/0132422 A1 | 7/2003 | Tian et al. |
| 2003/0152804 A1 | 8/2003 | Miura et al. |
| 2003/0213611 A1 | 11/2003 | Morita |
| 2004/0155225 A1 | 8/2004 | Yamada et al. |
| 2004/0263074 A1 | 12/2004 | Baroky et al. |
| 2005/0001225 A1 | 1/2005 | Yoshimura et al. |
| 2005/0189863 A1 | 9/2005 | Nagatomi et al. |
| 2005/0205845 A1 | 9/2005 | Deising et al. |
| 2005/0253500 A1 | 11/2005 | Gotoh et al. |
| 2005/0267243 A1 | 12/2005 | Amasaki et al. |
| 2006/0006782 A1 | 1/2006 | Nagatomi et al. |
| 2006/0017365 A1 | 1/2006 | Nagatomi et al. |
| 2006/0021788 A1 | 2/2006 | Kohayashi et al. |
| 2006/0022573 A1 | 2/2006 | Gotoh et al. |
| 2006/0033083 A1 | 2/2006 | Sakane et al. |
| 2006/0043337 A1 | 3/2006 | Sakane et al. |
| 2006/0045832 A1 | 3/2006 | Nagatomi et al. |
| 2006/0065878 A1 | 3/2006 | Sakane et al. |
| 2006/0076883 A1 | 4/2006 | Himaki et al. |
| 2006/0091790 A1 | 5/2006 | Nagatomi et al. |
| 2006/0170332 A1 | 8/2006 | Tamaki et al. |
| 2006/0197432 A1 | 9/2006 | Nagatomi et al. |
| 2006/0197439 A1 | 9/2006 | Sakane et al. |
| 2006/0220047 A1 | 10/2006 | Nagatomi et al. |
| 2006/0220520 A1 | 10/2006 | Sakane et al. |
| 2006/0244356 A1 | 11/2006 | Nagatomi et al. |
| 2007/0007494 A1 | 1/2007 | Hirosaki et al. |
| 2007/0029525 A1 | 2/2007 | Gotoh et al. |
| 2007/0164308 A1 | 7/2007 | Yoshimura et al. |

FOREIGN PATENT DOCUMENTS

| | | |
|---|---|---|
| EP | 1 296 376 A2 | 3/2003 |
| EP | 1 445 295 A1 | 8/2004 |
| JP | 05-015655 | 1/1993 |
| JP | 05-198433 | 8/1993 |
| JP | 11-144938 | 5/1999 |
| JP | 11-277527 | 10/1999 |
| JP | 2000-073053 | 3/2000 |
| JP | 2000-153167 | 6/2000 |
| JP | 2001-214162 | 8/2001 |
| JP | 2002-363554 | 12/2002 |
| JP | 2003-013059 | 1/2003 |
| JP | 2003-096446 | 4/2003 |
| JP | 2003-124527 | 4/2003 |
| JP | A 2003-515655 | 5/2003 |
| JP | 2003-277746 | 10/2003 |
| JP | 2003-336059 | 11/2003 |
| JP | 2004-055910 | 2/2004 |
| JP | 2004-505470 | 2/2004 |
| JP | 2004-067837 | 3/2004 |
| JP | 2004-145718 | 5/2004 |
| JP | 2004-189997 | 7/2004 |
| JP | A-2004-186278 | 7/2004 |
| JP | 2004-235598 | 8/2004 |
| JP | A 2004-244560 | 9/2004 |
| JP | 2004-055536 | 12/2004 |
| JP | 2005-344025 | 12/2005 |
| JP | 2006-028295 | 2/2006 |
| JP | 2006-063214 | 3/2006 |
| JP | 2006-063286 | 3/2006 |
| JP | 2006-070109 | 3/2006 |
| JP | 2006-176546 | 7/2006 |
| JP | A-2006-282809 | 10/2006 |
| JP | A-2006-282872 | 10/2006 |
| WO | WO 01/40403 A1 | 6/2001 |
| WO | WO 2004/039915 A1 | 5/2004 |
| WO | WO 2004/055910 A1 | 7/2004 |
| WO | WO 2005/052087 A1 | 6/2005 |
| WO | WO 2006/093298 A1 | 9/2006 |

OTHER PUBLICATIONS

"Phosphor Handbook"; (compiled by Phosphor Research Society, published by Ohmusha, Ltd., 1987); pp. 172-176.

K. Uheda et al., "The Crystal Structure and Photoluminescence Properties of a New Red Phosphor, Calcium Aluminum Silicon Nitride Doped With Divalent Euroium," Abs. 2073, 206th Meeting., Oct. 3, 2004.

WAVELENGTH (nm)

US 7,476,336 B2

PHOSPHOR AND MANUFACTURING METHOD FOR THE SAME, AND LIGHT EMITTING DEVICE USING THE PHOSPHOR

TECHNICAL FIELD OF THE INVENTION

The present invention relates to a phosphor containing nitrogen used in a display such as a cathode-ray tube (CRT), a field emission display (FED), and a plasma display (PDP), a semiconductor light emitting device (referred to as LED in some cases hereafter), and an illumination device such as a fluorescent lamp and a fluorescent display tube, and a light emitting appliance such as a back light for liquid crystal display, and a method of manufacturing of the same, and also to a light emitting device such as a white LED lighting unit in which the LED and the phosphor are combined.

BACKGROUND OF THE INVENTION

At present, a discharge type fluorescent lamp and an incandescent bulb used as the illumination device involve problems that a harmful substance such as mercury is contained, and life span is short. However, in recent years, a high luminescence LED emitting light of blue to near ultraviolet/ultraviolet region has been developed in sequence, and a study and a development have been actively performed, on creating white light by mixing near ultraviolet/ultraviolet to blue light emitted from the LED and the light emitted from the phosphor having an excitation band in a wavelength region thereof, and using such a white light as an illumination of the next generation. When the white LED illumination is put to practical use, there are advantages such as being highly efficient in converting an electrical energy into light with less heat generation, having a good life span without burn-out of a filament as is seen in a conventional incandescent bulb because it is constituted of the LED and a phosphor, including no harmful substance such as mercury, and realizing a small size illumination device. This contributes to obtaining an ideal illumination device.

In the same way as the light emitting device such as a usual fluorescent lamp, the light emitting device comprising the LED and the phosphor, with low power consumption and high luminance and having improved efficiency is desired. In order to improve the efficiency of a device itself, in addition to improvement in extraction efficiency of light from a semiconductor device which is an excitation source, the phosphor capable of efficiently converting the light becoming the excitation source into a different wavelength is desired. Particularly, the phosphor capable of efficiently emitting light in the near ultraviolet/ultraviolet to blue region, which is an emission wavelength of the semiconductor device, is desired.

Therefore, the study on the phosphor with excellent efficiency is actively performed at present, along with a further improvement in the conventional oxide base, sulfide base, and phosphoric phosphors, in recent years, the phosphor with new composition like a nitride phosphor such as $Ca_2Si_5N_8$:Eu, $Sr_2Si_5N_8$:Eu, $Ba_2Si_5N_8$:Eu, $CaSrSi_5N_8$:Eu, and $Sr_2Si_5N_8$:Ce, (see patent documents 1 and 2), and an oxynitride phosphor such as $Sr_2Si_3Al_2N_8O_2$:Eu (see patent document 3) have been developed in a sequence. Some of the phosphors containing nitrogen are excellent in temperature characteristic and durability, thereby having been used in the light emitting device such as a white LED lighting unit.

(Patent document 1) Japanese Unexamined Patent Publication No. 2003-515655
(Patent document 2) Japanese Patent Laid Open No. 2004-244560
(Patent document 3) International Publication No. 2004/055910 A1 Pamphlet The phosphor thus containing nitrogen has an excellent emission efficiency and has an excellent durability to heat and water. However, the phosphor thus containing nitrogen according to the conventional art does not have an emission efficiency with satisfactory level under an excitation of an excitation light from the near ultraviolet/ultraviolet to green regions, thereby not having a sufficient emission intensity and luminance. Therefore, although the white LED lighting unit having the excellent durability can be manufactured, the luminance, which is an important element, becomes insufficient when the light emitting device is manufactured by combining the near ultraviolet/ultraviolet LED, blue LED, etc., and the phosphor thus containing nitrogen, because the emission intensity and the luminance are insufficient. Further, as a manufacturing method of the phosphor thus containing nitrogen according to the conventional art, there is no choice but use a nitride raw material which is unstable in an atmospheric air, because the emission efficiency is decreased when a slight amount of oxygen is included during mixing the raw materials. Also, there is no choice but use the method of treating and mixing the raw materials in the inert atmosphere to prevent the oxidization of the nitride raw material during mixing the raw materials, or fire the raw materials in a strong reducing atmosphere and a nitride atmosphere such as 100% ammonia. Therefore, it is difficult to improve the productivity.

SUMMARY OF THE INVENTION

In view of the above-described circumstances, an object of the present invention is to provide an phosphor having an excellent emission efficiency and luminance under an excitation of an excitation light of near ultraviolet/ultraviolet to green color, and a manufacturing method of the phosphor capable of improving the productivity, and a light emitting device such as a white LED lighting unit using the phosphor.

In order to solve the aforementioned problem, after studying on phosphors with various composition containing nitrogen, the present inventors achieve a new oxynitride phosphor having a wide excitation band in a broad region from the near ultraviolet/ultraviolet to green color and having a strong emission intensity and luminance. Further, the present inventors also achieve the manufacturing method of the new oxynitride phosphor using the conventional method of manufacturing the phosphor in a nitrogen atmosphere or in a nitrogen-hydrogen mixed atmosphere, by using a raw material structure wherein the raw materials can be easily mixed even in an atmospheric air without using a nitride raw material and a metal raw material which are unstable in the atmospheric air.

In order to solve the aforementioned problem, the present invention takes several aspects as follows.

In a first aspect, a phosphor is provided, which is given by a general composition formula expressed by $M_mA_aB_bO_oN_n$:Z, (wherein, element M is more than one kind of element having bivalent valency, element A is more than one kind of element having tervalent valency, element B is more than one kind of element having tetravalent valency, O is oxygen, N is nitrogen, and element Z is more than one kind of element acting as the activator.), satisfying $2.5<(a+b)/m<4.5$, $0<a/m<2.0$, $2.0<b/m<4.0$, $0<o/m<1.0$, $o<n$, $n=2/3m+a+4/3b-2/3o$.

In a second aspect, the phosphor according to the first aspect is provided, which is given by the composition formula expressed by $2.5<(a+b)/m<4.0$, $0<a/m<1.0$, $0<o/m<0.5$.

In a third aspect, the phosphor according to either of the first aspect or the second aspect is provided, which is given by the composition formula expressed by $2.5<(a+b)/m<4.0$, $0.1 \leq a/m<1.0$, $2.5 \leq b/m \leq 3.5$.

In a fourth aspect, the phosphor according to any one of the first to third aspects is provided, wherein the element M is more than one kind of element selected from a group consisting of Mg, Ca, Sr, Ba, Zn, and rare earth elements having bivalent valency, element A is more than one kind of element selected from a group consisting of Al, Ga, In, Tl, Y, Sc, P, As, Sb, and Bi, element B is more than one kind of element selected from a group consisting of Si, Ge, Sn, Ti, Hf, Mo, W, Cr, Pb, Zr, and element Z is more than one kind of element selected from the group consisting of the rare earth elements and transition metal elements.

In a fifth aspect, the phosphor according to any one of the first to fourth aspects is provided, wherein the element M is more than one kind of element selected from a group consisting of Mg, Ca, Sr, Ba, Zn, element A is more than one kind of element selected from a group consisting of Al, Ga, In, element B is Si and/or Ge, and element Z is more than one kind of element selected from a group consisting of Eu, Ce, Pr, Tb, Mn, and Yb.

In a sixth aspect, the phosphor according to any one of the first to fifth aspects is provided, wherein when the general formula is expressed by MmAaBbOoNn:Zz, the value of $z/(m+z)$, which is a molar ratio of the element M to the element Z, is not less than 0.0001 and not more than 0.5.

In a seventh aspect, the phosphor according to any one of the first to sixth aspects is provided, wherein the element M needs Sr and further is more than one kind of element properly selected from the group consisting of Ca and Ba, the element A is Al, the element B is Si, and the element Z is Eu and/or Ce.

In an eighth aspect, the phosphor according to any one of the first to seventh aspects is provided, wherein the formula is given by $(P_{25}-P_{100})/P_{25} \times 100 \leq 10.0$, where the value of a relative intensity of a maximum peak in an emission spectrum is defined as $P_{25}$ when the phosphor is irradiated with a predetermined monochromatic light in a wavelength range from 300 nm to 550 nm as an excitation light at 25° C., and the value of the relative intensity of the maximum peak is defined as $P_{100}$ when the phosphor is irradiated with the predetermined monochromatic light as the excitation light at 100° C.

In a ninth aspect, the phosphor according to any one of the first to eighth aspects is provided, containing:

not less than 33.0 wt % and not more than 40.0 wt % of Sr;
not less than 1.0 wt % and not more than 6.0 wt % of Al;
not less than 25.0 wt % and not more than 31.0 wt % of Si;
not less than 0.5 wt % and not more than 6.0 wt % of O;
not less than 20.0 wt % and not more than 26.0 wt % of N; and
not less than 0.1 wt % and not more than 8.0 wt % of Eu,
wherein when the phosphor is irradiated with more than one kind of monochromatic light or continuous light in the wavelength range from 300 nm to 550 nm as the excitation light, the phosphor has the emission spectrum with a maximum peak wavelength in a range from 630 to 660 nm.

In a tenth aspect, the phosphor according to any one of the first to ninth aspects is provided, which has an orthorhombic crystal structure.

In an eleventh aspect, the phosphor according to any one of the first to tenth aspects is provided, which has an X-ray powder diffraction pattern by CoKα ray with two peaks in a range from 42.0° to 43.1° of Bragg angle (2θ) among the diffraction peaks with 30% or more relative intensity with respect to the relative intensity of the maximum peak.

In a twelfth aspect, the phosphor according to the eleventh aspect is provided, containing a primary particle with particle size of 20 μm or less and aggregates in which the primary particle agglutinates, wherein an average particle size (D50) of a powdery phosphor containing the primary particle and the aggregates is not less than 1.0 μm and not more than 20.0 μm.

In a thirteenth aspect, the phosphor according to the twelfth aspect is provided, wherein the aggregates of the primary particle contains a columnar particle.

In a fourteenth aspect, a manufacturing method of the phosphor to manufacture the phosphor according to any one of the first to thirteenth aspects is provided, wherein by using a crucible composed of nitride as a firing crucible, a raw material is fired at temperature of not less than 1600° C. and not more than 2000° C.

In a fifteenth aspect, the manufacturing method of the phosphor according to the fourteenth aspect is provided, wherein the raw material is fired by setting pressure inside furnace at 0.5 MPa or less.

In a sixteenth aspect, the manufacturing method of the phosphor according to either of the fourteenth aspect or the fifteenth aspect is provided, wherein the crucible composed of nitride is a BN crucible.

In a seventeenth aspect, the manufacturing method of the phosphor according to any one of the fourteenth to sixteenth aspects is provided, wherein the raw material is fired, with gas containing 90% or more of nitrogen gas being kept flowing in a furnace at not less than 0.1 ml/min.

In an eighteenth aspect, the manufacturing method of the phosphor according to any one of the fourteenth to seventeenth aspects is provided, wherein the raw material is fired in a powdery state.

In a nineteenth aspect, the manufacturing method of the phosphor according to any one of the fourteenth to eighteenth aspects is provided, wherein carbonate of the element M is used as the raw material of the element M.

In a twentieth aspect, a light emitting device is provided, having the phosphor according to any one of the first to thirteenth aspects and a light emission part for emitting light of a first wavelength, wherein the light with a wavelength different from the first wavelength is emitted from the phosphor with a part of or the whole part of the light of the first wavelength as an excitation light.

In a twenty-first aspect, the light emitting device according to the twentieth aspect is provided, wherein the first wavelength is the wavelength in a range from 300 nm to 550 nm.

In a twenty-second aspect, the light emitting device according to either of the twentieth aspect or the twenty-first aspect is provided, wherein the light emission part for emitting the light of the first wavelength is an LED.

The phosphor according to any one of the first to eleventh aspects has an emission spectrum with a broad peak in a range from 500 to 780 nm, has a broad flat excitation band in the range from the near ultraviolet/ultraviolet to green color, and has an improved emission intensity and luminance, and also has an excellent durability against heat and water.

According to the phosphor of the twelfth aspect or the thirteenth aspect, the phosphor thus obtained is in a powdery state, thereby allowing the phosphor to be applied on various places as a paste. In addition, the phosphor has a mean particle size (D50) of 1.0 μm to 20.0 μm, thereby allowing the coating application density to be increased, to make it possible to obtain a coated film with high emission intensity and luminance.

According to the manufacturing method of the phosphor of the fourteenth aspect to nineteenth aspect, the phosphor according to any one of the first to thirteenth aspects can be easily manufactured at a low manufacturing cost.

According to the light emitting device of either of the twentieth aspect or the twenty-second aspect, a high efficient light emitting device having a desired emission color and improved emission intensity and luminance can be obtained.

BEST MODE FOR CARRYING OUT THE INVENTION

Figure 1:
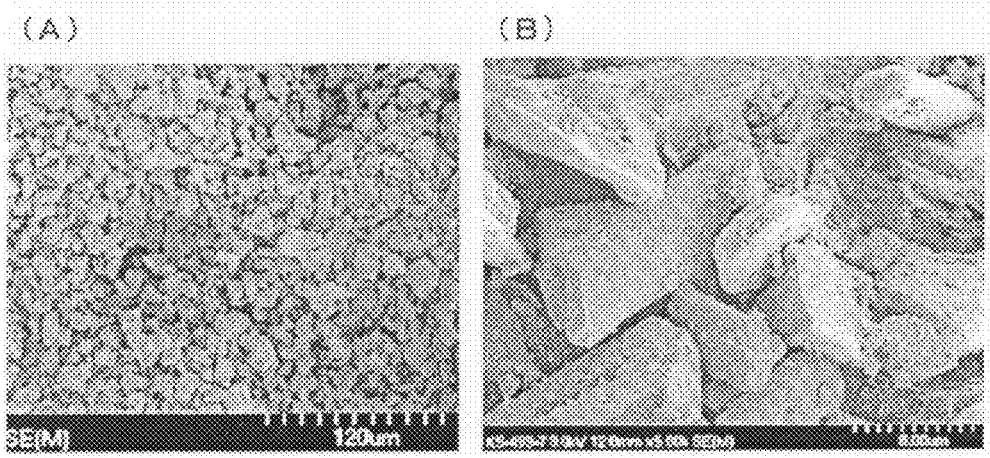
FIG. 1A is an SEM photograph of a phosphor powder of an example 1.
FIG. 1B is the SEM photograph expanding a part of FIG. 1A.

Examples of the present invention will be explained hereunder, however, the present invention is not limited thereto.

A phosphor of the present invention is the phosphor having a matrix composition given by a general formula MmAaBbOoNn:Z. Here, element M is more than one kind of element selected from the elements having bivalent valency in the phosphor. Element A is more than one kind of element having tervalent valency in the phosphor, element B is more than one kind of element having tetravalent valency in the phosphor, O is oxygen, N is nitrogen, and Z is the element acting as the activator in the phosphor and more than one kind of elements selected from rare earth elements or transition metal elements.

Further, in the phosphor, when $(a+b)/m$ is in a range satisfying $2.5<(a+b)/m<4.5$, $a/m$ is in the range satisfying $0<a/m<2.0$, $b/m$ is in the range satisfying $2.0<b/m<4.0$, $o/m$ is in the range satisfying $0<o/m<1.0$, oxygen and nitrogen has a relation satisfying $o<n$, and nitrogen is expressed by $n=2/3m+a+4/3b-2/3o$, and more preferably, when $(a+b)/m$ is in the range satisfying $2.5<(a+b)/m\leq4.0$, $a/m$ is in the range satisfying $0<a/m<1.0$, and $o/m$ is in the range satisfying $0<o/m<0.5$, preferably the emission intensity and the luminance are further improved with high efficiency. Further preferably, when $(a+b)/m$ is in the range satisfying $2.5<(a+b)/m<4.0$, $a/m$ is in the range satisfying $0.1\leq a/m<1.0$, and $b/m$ is in the range satisfying $2.5\leq b/m\leq3.5$, preferably the emission intensity and the luminance are further improved with high efficiency.

The phosphor of this example having the aforementioned characteristics has an emission spectrum with a broad peak in the range from green color to yellow color or yellow color to red color, and has a flat excitation band in the broad range from near ultraviolet/ultraviolet to green color (wavelength range from 300 nm to 550 nm), and is capable of obtaining a high efficient emission. Therefore, by mixing the phosphor and the phosphor of suitable other color, a phosphor mixture is obtained. Then, by combining the phosphor mixture and a light emission part such as the near ultraviolet/ultraviolet LED and the blue LED and so forth, a high efficient emission having an excellent color rendering property, a desired emission color, and high emission intensity and luminance can be obtained.

The phosphor of this example has a stronger emission intensity, compared with a silicon nitride-based phosphor (for example see patent documents 1 and 2), and oxynitride phosphor (for example, see patent document 3) proposed heretofore. Therefore, the white LED lighting unit with further high luminance can be manufactured.

In regards to the emission wavelength of the phosphor according to this embodiment, although different in accordance with the activator, as a typical case, when activated by Ce, the phosphor having the emission spectrum with a peak in the range from green color to yellow color can be obtained, and when activated by Eu, the phosphor having the emission spectrum with a peak in the rage from orange color to red color can be obtained. The phosphor according to this embodiment activated by the Eu is different from red phosphors $Ca_2Si_5N_8$:Eu, $Sr_2Si_5N_8$:Eu, $Ba_2Si_5N_8$:Eu, $Ca_x(Al,Si)_{12}(O, N)_{16}$:Eu (wherein $0<x\leq1.5$), $CaAl_2Si_4N_8$:Eu, $CaSiN_2$:Eu, $CaAlSiN_3$:Eu, and can be suitably used in the white LED lighting unit.

Next, explanation will be given to the fact that by using the phosphor according to this embodiment, the light emission with high color rendering properties can be obtained. Here, the color rendering properties means variation in the looks of the color of an object irradiated with light, depending on the kinds of the light source. Generally, the color rendering properties showing reproducibility of the color of an illuminated object can be expressed numerically by general color rendering index (Ra). If absolutely the same color as the color viewed with a reference light can be reproduced, the best color rendering index (Ra=100) is obtained, and the larger the difference in color thus reproduced is, the lower the Ra value is. (Ra<100)

Of course, as an illuminating light source, preferably, the way of looks of the color is the same as in the case of using the reference light. However, the reference light has a white light source having uniform intensity of the light over the whole visible light region. Meanwhile, the existing white LED illumination lacks in uniformity in the intensity of the light. For example, the intensity of the light is high in a certain wavelength region, and low in a certain wavelength region of the visible light. Therefore, in the wavelength region where the intensity of the light is insufficient, color reproducing properties are deteriorated, and the color rendering properties are deteriorated.

After all, in order to obtain the emission with high color rendering property, the phosphor used in the white LED illumination needs to have an emission spectrum with a broad peak, and needs to have a sufficient emission intensity. Particularly, in the red phosphor, the emission wavelength is on the side of a long wavelength, and is required to have a high luminance. In the phosphor of the present invention having the aforementioned matrix composition, by changing the kind of a composite element and the kind of the activator, the phosphor having a high emission intensity and luminance in the range from green color to yellow color, or from orange color to red color, having a high emission intensity and luminance, and particularly having the emission spectrum with a peak on the side of the long wavelength of not less than 630 nm, and having an emission spectrum with a broad peak of not less than 80 nm half value width can be obtained.

A detailed reason is unclear why the phosphor according to this embodiment is capable of emitting light with high efficiency having the emission spectrum with a broad peak in the range from green color to yellow color and from orange color to red color. However, it can be substantially considered as follows. First, in the phosphor of this example given by the general formula MmAaBbOoNn:Z, by setting the values of m, a, b, o, and n in the range satisfying $2.5<(a+b)/m<4.5$, $0<a/m<2.0$, $2.0<b/m<4.0$, $0<o/m<1.0$, $o<n$, $n=2/3m+a+4/3b-2/3o$, it is estimated that the activator can exist regularly in the crystal structure of the phosphor, and an excitation energy can be efficiently transferred, thereby improving the emission efficiency.

Further, by setting $(a+b)/m$ in the range satisfying $2.5<(a+b)/m<4.0$, setting $a/m$ in the range satisfying $0<a/m<1.0$, and setting $o/m$ in the range satisfying $0<o/m<0.5$, a chemically stable composition is obtained. Therefore, it is estimated that an impurity phase not contributing to the light emission is hardly generated, thereby suppressing the deterioration in the emission intensity. Specifically, when a plurality of impurity phases are generated, it is estimated that an amount of the phosphor per unit area is decreased, and further the excitation light and the light generated from the phosphor are absorbed by generated impurity phase, whereby the emission efficiency of the phosphor is deteriorated, thereby not obtaining a high emission intensity.

When the values of m, a, b, o, and n are in the aforementioned range in an X-ray diffraction measurement performed to the phosphor according to this embodiment after firing, the peak of the impurity phase of an unreacted raw material such as AlN and $Si_3N_4$ and the peak of the impurity phase different from the phase contributing to the light emission are not confirmed, or even when they are confirmed, a diffraction intensity is significantly low. Meanwhile, when the values of m, a, b, o, and n are outside the aforementioned range, a remarkable peak of the phase of the AlN, $Si_3N_4$, and the phase different from the phase contributing to the light emission are confirmed. This substantiates the above-described estimation. Then, when the peak of the impurity phase is not confirmed during X-ray diffraction patterning performed to the phosphor after firing, it can be estimated that the phosphor to be measured has a high emission intensity.

In the phosphor of this example expressed by the general formula MmAaBbOoNn:Z, the values of m, a, b, o, and n may be in the range satisfying $2.5<(a+b)/m<4.5$, $0<a/m<2.0$, $2.0<b/m<4.0$, $0<o/m<1.0$, $o<n$, $n=2/3m+a+4/3b-2/3o$, and further preferably may be in the range satisfying $2.5<(a+b)/m<4.0$, $0<a/m<1.0$, and $0<o/m<0.5$. When $(a+b)/m$ is in the aforementioned range, the impurity phase not contributing to the light emission and other light emission phase are prevented from generating, thus also preventing the emission efficiency and color purity from deteriorating, to thereby obtain the light emission with high efficiency.

Further, as can be judged from the result of the example, when $a/m \neq 0$, it is possible to prevent the generation of a different crystal structure mainly composed of glass component, which is caused by the excessive replacement of nitrogen in the crystal structure with oxygen enhanced by the excessive reaction of oxygen and element Si contained in the raw materials during firing. Thus, it is also possible to prevent the deterioration in the emission efficiency. Accordingly, by setting $a/m$ larger than 0, the deterioration in the emission efficiency can be obviated. Also, AlN serving as the raw material of the element A, has a high melting point, and therefore when $a/m$ is smaller than 1.0, the productivity on manufacturing can be improved. Also, when the value of b is larger than that of a, sintering is restrained, making it possible to easily obtain the phosphor of the present invention in a powdery state after firing. Therefore, preferably the range of $b/m$ is larger than $a/m$, satisfying $2.0<b/m<4.0$.

Preferably, the phosphor of this embodiment satisfies $n>o$, and contains oxygen. When oxygen content is in a proper range, emission characteristics of the phosphor can be improved, and this is preferable from the viewpoint of productivity. When the proper range of the oxygen content is beyond 0.5 wt % and under 10.0 wt % with respect to the mass of the phosphor, excellent emission characteristics can be obtained and vitrifying described above is restrained, to thereby produce a sufficiently practicable phosphor. At this time, in the phosphor expressed by the general formula MmAaBbOoNn:Z, when the range of the value of o calculated by the raw material to be used and a blending ratio is defined in consideration of the aforementioned oxygen content, the relation is given by $0<o/m<1.0$. Further preferably the oxygen content is beyond 0.5 wt % and under 6.0 wt %, and the range of o is given by $0<o/m<0.5$.

When the value of o calculated by a composition analysis result and the value of o calculated by the blending ratio of the raw material to be used are compared, there is a deviation between these values. This is because the raw material is fired in a reduction atmosphere containing nitrogen at an extremely high temperature, and therefore unnecessary oxygen for forming a higher-temperature stable phase becomes carbon dioxide gas and water vapor, or nitrogen oxide gas which is reacted with the nitrogen in the atmospheric air during firing, and released from a generated product. Therefore, it appears that the oxygen is obtained by being more reduced than the composition formula calculated from the blending ratio.

Further, in the phosphor having the aforementioned general formula MmAaBbOoNn:Z, the element M is the element having + bivalent valency, the element A is the element having + tervalent valency, the element B is the element having + tetravalent valency, and the nitrogen is the element having − tervalent valency. Therefore, m, a, b, o, and n are expressed by the composition $n=2/3m+a+4/3b-2/3o$, and zero is obtained by adding the valency of each element, and preferably the phosphor becomes a further stable compound. Particularly, when satisfying $2.5<(a+b)/m<4.0$, $0.1 \leq a/m<1.0$, and $2.5 \leq b/m \leq 3.5$, it was found that the phosphor was obtained, having the high emission intensity and the emission spectrum with a broad and flat excitation band in the range from near ultraviolet/ultraviolet to green color. In any case, a slight deviation from the composition formula showing the composition of the phosphor is allowable.

Meanwhile, the element M is preferably more than one kind of element selected from the group consisting of Mg, Ca, Sr, Ba, and Zn, and rare earth elements having bivalent valency, more preferably is more than one kind of element selected from the group consisting of Mg, Ca, Sr, Ba, and Zn, and most preferably needs Sr, and is more than one kind of element suitably selected from the group consisting of Ca and Ba (in some cases, Ca and Ba are not selected).

The element A is preferably at least more than one kind of element selected from the group consisting of Al, Ga, In, Tl, Y, Sc, P, As, Sb, and Bi, is further preferably at least more than one kind of element selected from the group consisting of Al, Ga, and In, and is most preferably the element Al. As the Al, preferably AlN is used as a general thermoelectric material and structural material, is easily available at a low cost, and in addition, has a small environmental load.

The element B is preferably at least more than one kind of element selected from the group consisting of Si, Ge, Sn, Ti, Hf, Mo, W, Cr, Pb, and Zr, is further preferably the elements Si and/or Ge, and is most preferably the element Si. As the Si, preferably $Si_3N_4$, which is nitride, is used as the general thermoelectric material and structural material, is easily available at a low cost, and in addition has a small environmental load.

The element Z is more than one kind of element selected from the rare earth elements or transitional metal elements which are blended in the form of replacing a part of the element M in a matrix structure of the phosphor. Therefore, in the present invention, 'm' showing the molar ratio of the element M is a numerical value including the molar ratio z of the element Z.

From the viewpoint of exhibiting a sufficient color rendering properties by each kind of light source such as the white LED lighting unit using the phosphor of this embodiment, preferably the phosphor has the emission spectrum with a peak having a broad half value width. In addition, from the same viewpoint, preferably the element Z is more than one kind of element selected from the group consisting of Eu, Mn, Yb, Ce, Tb, and Pr. Among these elements, when Eu is used as the element Z, the phosphor shows the emission spectrum with a broad peak in a red region with high emission intensity, and when Ce is used, the phosphor shows the emission spectrum with a broad peak in the region from green to yellow with high emission intensity. Therefore, this is preferable as the activator of each kind of light source such as a white LED illumination.

In addition, by selecting the element Z, the peak wavelength of the light emission in the phosphor of the present invention can be changed, and also by being activated by the different kind of element Z, the peak wavelength can be changed, and further by a photosensitizing effect, the emission intensity and luminance can be improved.

An amount of the element Z to be added is preferably in the range of not less than 0.0001 and not more than 0.50 in the molar ratio $z/(m+z)$ of the element M and the element Z as the activator, when the phosphor of this embodiment is expressed by the general formula $M_mA_aB_bO_oN_n:Z_z$ (wherein $2.5<(a+b)/m<4.5$, $0<a/m<2.0$, $2.0<b/m<4.0$, $0<o/m<1.0$, $o<n$, $n=2/3m+a+4/3b-2/3o$). When the molar ratio $z/(m+z)$ of the element M and the element Z is in the aforementioned range, concentration quenching caused by an excessive content of the activator (element Z) can be obviated, and thus the emission efficiency is prevented from deteriorating. Meanwhile, insufficiency of atomic element to contribute to the light emission due to too little content of the activator (element Z) can also be obviated, and thus the emission efficiency is prevented from deteriorating. Further, the value of the $z/(m+z)$ is preferably in the range of not less than 0.001 and not more than 0.30. However, an optimal value of the range of the $z/(m+z)$ is slightly fluctuated by the kind of the activator (element z) and the kind of the element M. Further, by controlling the amount of the activator (element Z) to be added also, the peak wavelength of the light emission of the phosphor can be set so as to be shifted, and this is effective when adjusting the luminance in the light source obtained.

In the phosphor according to the present invention (general formula $M_mA_aB_bO_oN_n:Z$), when Sr is selected as the element M, Al is selected as the element A, Si is selected as the element B, and Eu is selected as the element Z, satisfying $2.5<(a+b)/m<4.5$, $0<a/m<2.0$, $2.0<b/m<4.0$, $0<o/m<1.0$, $o<n$, $n=2/3m+a+4/3b-2/3o$, a weight ratio of the element constituting the phosphor is obtained, such as Sr of 33.0 to 40.0 wt %, Al of 1.0 to 6.0 wt %, Si of 25.0 to 31.0 wt %, oxygen of 0.5 to 6.0 wt %, nitrogen of 20.0 to 26.0 wt %, and Eu of 0.1 to 8.0 wt % (however, ±1.0 wt % of error is estimated for Sr and Al, ±2.0 wt % of error is estimated for Si, and more preferable range is selected for oxygen and Eu.) At this time, when the phosphor is irradiated with the monochromatic light in the wavelength range from 300 nm to 550 nm or mixed light of the monochromatic light, the maximum peak wavelength of the emission spectrum becomes in the range from 630 to 660 nm. The phosphor in this condition exhibits sufficient emission intensity and preferable emission characteristics.

A product phase included in the phosphor of this embodiment has an orthorhombic crystal lattice, having an X-ray powder diffraction pattern by $CoK\alpha$ ray wherein two diffraction peaks has 30% or more relative intensity with respect to the relative intensity of the maximum peak, in a range from 42.0° to 43.1° of Bragg angle (2θ). This contributes to obtaining the phosphor with high efficiency having the emission spectrum with a peak in the longer wavelength side.

Next, temperature characteristics of the phosphor of this embodiment will be explained. Sometimes, the phosphor is used not only in the white LED, but also in an environment of high temperature. Therefore, the phoshpor which deteriorates in the emission intensity as the temperature increases, or deteriorates in the emission characteristics due to a thermal deterioration is not preferable. For example, although a sulfide phosphor is excellent in the emission characteristics, a plurality of sulfide phosphors deteriorate in the emission intensity as the temperature increases, and deteriorate in the emission characteristics due to the thermal deterioration. Meanwhile, the phosphor of the present invention exhibits excellent temperature characteristics and heat resistance. When the value of the relative intensity of the maximum peak in the emission spectrum at 25° C. is defined as emission intensity $P_{25}$ when the phosphor is irradiated with the monochromatic light in the region from the near ultraviolet/ultraviolet to green color (wavelength range from 300 to 550 nm) or the mixed light of the monochromatic light as the excitation light, and the value of the relative intensity of the maximum peak of the aforementioned phosphor at 100° C. is defined as $P_{100}$, the relation is satisfied as $(P_{25}-P_{100})/P_{25} \times 100 \leq 10.0$. This is because AlN and $Si_3N_4$, which are high temperature materials, are used in the raw material, and therefore a tetrahedral structure of $(SiN_4)$ establishes a network like sialon, and excellent temperature characteristics can thereby be exhibited. Also, slightly contained oxygen is one of the contributing factor of exhibiting the excellent temperature characteristics and heat resistance.

When the phosphor of this embodiment is in a powdery state, it can be easily applied to various light sources including the white LED illumination. Here, when the phosphor of the present invention is used in a powdery state, it is preferable to contain a primary particle with particle size of 20 μm or less and aggregates in which the primary particle agglutinates, wherein the an average particle size (D50) of the powdery phosphor containing the primary particle and the aggregates is not less than 1.0 μm and not more than 20.0 μm. This is because if the average particle size is not more than 20.0 μm, the pulverization followed thereafter is facilitated, and if the average particle size is 20 μm or less, the surface area per unit weight of the powder can be secured and the deterioration in the luminance can be prevented. Also, even when the powder is formed in a pasty state, which is then applied on the light emitting element or the like, the density of the powder can be increased, and from this viewpoint also, the deterioration in the luminance can be averted. In addition, according to the study by the inventors of the present invention, although a detailed reason is not clarified, from the viewpoint of the emission efficiency of the phosphor powder, it was found that the average particle size of 1.0 μm or larger was preferable. As described above, preferably the average particle size of the powder in the phosphor of this embodiment is not less than 1.0 μm and not more than 20 μm. Moreover, in this embodiment, when the particle having a columnar particle shape is contained in the aggregates of the primary particle of a phosphor particle, an improvement in the emission characteristics of the phosphor is confirmed, and this is preferable.

The phosphor of this embodiment has the emission spectrum with a peak in the range from green color to yellow color, and orange color to red color, with a broad peak shape. Therefore, the phosphor with the above structure is suitable as a white LED illuminating phosphor, from the viewpoint of color rendering properties. Further, by having a flat excitation band in a broad range from the near ultraviolet/ultraviolet to green color (wavelength range from 300 to 550 nm), for example, the phosphor of the present invention can be used while exhibiting the emission intensity in a state which is close to the maximum emission intensity, in each case of the white LED illumination to obtain white color by utilizing a complimentary relation of blue emission of the high luminance blue LED (in the vicinity of the 460 nm wavelength), and yellow emission of the phosphor, or the white LED illumination to obtain white color by utilizing a mixed color of the light obtained from R, G, B and other phosphors by combining the LED emitting the near ultraviolet/ultraviolet light emission (in the vicinity of 380 to 410 nm of the wavelength), the phosphor emitting red color (R), the phosphor emitting green color (G), and the phosphor emitting blue color (B) under the excitation of the near ultraviolet/ultraviolet light generated from the LED. Specifically, by combining the light emission part emitting the near ultraviolet/ultraviolet to green color and the aforementioned phosphor, a white light source and the white LED illumination with high output and excellent color rendering properties and further an illumination unit using the same can be obtained.

Further, by a publicly-known method, the phosphor of this embodiment which is in a powdery state is combined with a light emission part (particularly the light emission part (such as LED) emitting the light in the wavelength range from 300 nm to 550 nm), and with a part or the whole part of the light emitted from this light emission part set as the excitation light, the light emission is caused to occur with a different wavelength from that of the light emitted from the light emission part. With this structure, various backlight devices for display and a lighting unit can be manufactured. In addition, by combining the phosphor of this embodiment in a powdery state with a discharge lamp generating ultraviolet rays by the publicly-known method, a fluorescent lamp, the lighting unit, and the backlight device for display can be manufactured. Further, by combining the phosphor of this embodiment in a powdery state with the LED light emitting element emitting the light from ultraviolet to green color by the publicly-known method, the lighting unit and the backlight device for display can be manufactured.

Next, in regards to a manufacturing method of the phosphor of this embodiment, by way of example, the manufacture of $Sr_4AlSi_{11}O_2N_{17}$:Eu (wherein Eu/(Sr+Eu)=0.030) is shown. However, $Sr_4AlSi_{11}O_2N_{17}$:Eu is estimated from a composition analysis result after manufacture and expressed by using the general formula MmAaBbOoNn:Zz, and the composition formula is not limited thereto. Here, z/(m+z) means Eu/(Sr+Eu).

Generally, a plurality of phosphors are manufactured by a solid-phase reaction, and the phosphor of this embodiment also can be obtained by the solid-phase reaction. However, the manufacturing method is not limited thereto. Each raw material of the element M, the element A, and the element B may be a commercially available material such as nitride, oxide, carbonate, hydroxide, and basic carbonate. However, particularly the carbonate is preferable for the element M. In addition, higher purity is preferable and the raw material with 2N or more, further preferably with 3N or more is therefore prepared. Preferably, the particle diameter of each particle of the raw material is generally a fine particle from the viewpoint of accelerating reaction. However, the particle diameter and the shape of the phosphor obtained are changed according to the particle diameter and the shape of the raw material. Therefore, by adjusting to the particle diameter and shape required for the phosphor finally obtained, the nitride raw material having the particle approximating to the particle diameter of the phosphor thus obtained may be prepared. As the raw material of the element Z, the commercially available raw material such as nitride, oxide, carbonate, hydroxide, and basic carbonate, or simple substance metal is preferable. Of course, higher purity of each raw material is preferable, and the raw material with 2N or more, further preferably with 3N or more is therefore prepared. Particularly, when the carbonate is used as the raw material of the element M, preferably the effect of flux can be obtained, without adding a compound composed of the element not contained in the constituent element of the phosphor of this embodiment as the flux (reaction accelerating agent).

In case of the manufacture of the composition formula $Sr_4AlSi_{11}O_2N_{17}$:Eu (wherein Eu/(Sr+Eu)=0.030), for example, it is preferable to prepare $SrCO_3$ (3N), AlN (3N), $Si_3N_4$ (3N), respectively as the raw material of the element M, the element A, and the element B, and prepare $Eu_2O_3$ (3N) as the element Z. These raw materials are weighed and mixed in 0.970 mol of $SrCO_3$, 0.25 mol of AlN, 2.75/3 mol of $Si_3N_4$, and 0.030/2 mol of $Eu_2O_3$, so that the molar ratio of each element is Sr:Al:Si:Eu=0.970:0.25:2.75:0.030. The carbonate is used as the Sr raw material, because when the raw material with low melting point such as the carbonate is used, the raw material itself works as the flux, to accelerate the reaction and improve the emission characteristics.

Also, when the oxide is used as the raw material, another substance may be added as the flux to obtain the effect of flux. However, in this case, the flux becomes an impurity, thereby making it possible to deteriorate the characteristic of the phosphor. This is the point to be noted. The nitride of each raw material element is easily influenced by humidity, and therefore it is preferable to operate in a glove box under an inert atmosphere from which the humidity is sufficiently removed. However, the weighing and mixing may also be conducted in an atmospheric air. A mixing system may be either way of a wet type or a dry type. However, when pure water is used as the solvent of the wet type mixing, the nitride raw material is oxidized, and therefore proper organic solvent needs to be selected. As a device, usual device such as a ball mill and a mortar may be used.

The raw material thus mixed is put in a crucible, retained and fired in a gas atmosphere containing 90% or more of nitrogen gas, which may contained the inert gas such as rare gas and a reduction gas such as hydrogen and ammonia, at not less than 1600° C., and more preferably at not less than 1700° C. and not more than 2000° C. for 30 minutes or more. When the firing temperature is set at not less than 1600° C., the solid-phase reaction is excellently accelerated, and the phosphor having the excellent emission characteristic can be obtained. Also, when the firing temperature is set at not more than 2000° C., an excessive sintering and melting is prevented from occurring. Note that higher firing temperature allows the solid-phase reaction to progress rapidly, thereby shortening a retaining time. Meanwhile, even when the firing temperature is low, by retaining the temperature for a long time, a target emission characteristic can be obtained. However, longer firing allows a particle growth to progress, thereby enlarging a particle size. Therefore, the firing time maybe set in accordance with a target particle size.

A furnace pressure during firing is preferably set to 0.5 MPa or less, and more preferably set to 0.1 MPa. This is because by firing under the pressure of 0.5 MPa or less, the sintering between particles is prevented from excessively progressing, and the pulverizing after firing is facilitated. An $Al_2O_3$ crucible, an $Si_3N_4$ crucible, an AlN crucible, a sialon crucible, a C (carbon) crucible, and a BN (boron nitride) crucible or the like which can be used in the aforementioned gas atmosphere may be used as a crucible. However, preferably when the BN crucible is used, intrusion of impurities can be averted.

Further, during firing, it is preferable to fire the raw material, with not less than 0.1 ml/min gas containing 90% or more of nitrogen gas being kept flowing in the furnace. This is because although gas is generated from the raw material during firing, by flowing the aforementioned gas atmosphere containing 90% or more of nitrogen gas, the gas generated from the raw material is prevented from filling in the furnace to have an influence on the reaction, thus preventing the deterioration in the emission characteristics of the phosphor. Particularly, when the carbonate, hydroxide, and basic carbonate are used, the raw material is decomposed during firing to become oxide, and the gas is generated. Therefore, it is preferable to flow the atmosphere in the furnace and discharge the gas thus generated.

In this embodiment, preferably, the raw material is fired in a powdery state. In a general solid-phase reaction, the progress of the reaction is considered, which is caused by a diffusion of the atomic element at a contact point of the raw materials, and a uniform reaction is accelerated in an entire body of the raw materials. Therefore, in many cases, the raw material is fired in a pellet shape. However, in the case of the raw material of the phosphor of the present invention, by firing the raw material in a powdery state, pulverization after firing is easy, and an ideal spherical shape of the primary particle is thereby obtained. Therefore, preferably, the phosphor thus obtained is easy to be treated as the powder. Further, when the carbonate, hydroxide, and basic carbonate are used, $CO_2$ gas or the like is generated, due to the decomposition of the raw material during firing. However, by making the raw material in a powdery state, the gas is completely discharged. Therefore, from the viewpoint of not having an adverse effect on the emission characteristics, it is preferable to make the raw material in a powdery state. Moreover, in the phosphor of this embodiment, in addition to the improvement in the emission characteristics, the particle having a columnar particle shape is observed in a phosphor particle. This is because in the composition of this embodiment, when a uniform crystal growth is progressed, the particle is apt to be formed in the columnar particle shape. The particle thus having the columnar shape is considered to exhibit the excellent emission characteristics. Accordingly, from the viewpoint of the improvement in the emission characteristics, preferably the aggregates of the primary particle in the phosphor particle includes the columnar particle.

After firing of the raw material is completed, a fired object is taken out of the crucible, and pulverized up to a predetermined average particle size, by using the mortar and the ball mill and so forth, to thereby manufacture the phosphor expressed by the composition formula $Sr_4AlSi_{11}O_2N_{17}$:Eu (wherein Eu/(Sr+Eu)=0.030). The phosphor thus obtained is then subjected to cleaning, classifying, and surface treatment as needed.

When other element is used as the element M, the element A, the element B, and the element Z, and when an amount of Eu to be activated, which is the activator, is changed, the phosphor can be manufactured by the same manufacturing method as that described above, by adjusting the blending amount of each raw material at the time of mixing.

EXAMPLE 1

Commercially available $SrCO_3$ (3N), AlN (3N), $Si_3N_4$ (3N) were prepared as each raw material of the element M, the element A, and the element B, and $Eu_2O_3$ (3N) was prepared as the element Z, so that the molar ratio of each element becomes Sr:Al:Si:Eu=0.970:0.25:2.75:0.030. Then, each raw material was weighed to obtain 0.970 mol of $SrCO_3$, 0.25 mol of AlN, 2.75/3 mol of $Si_3N_4$, and 0.030/2 mol of $Eu_2O_3$, and the raw materials thus weighed were mixed by using the mortar in the atmospheric air. The raw materials thus mixed were put in a BN crucible, then the temperature was increased up to 1800° C. at 15° C./min under the furnace pressure of 0.05 MPa in a nitrogen atmosphere (in a flow state), and retained/fired for 3 hours at 1800° C. Thereafter, the raw materials thus fired were cooled from 1800° C. to 200° C. for 1 hour, then a fired sample was pulverized up to a proper particle size in the atmospheric air by using the mortar, to obtain the phosphor according to an embodiment 1 expressed by the composition formula $Sr_4AlSi_{11}O_2N_{17}$:Eu (wherein Eu/(Sr+Eu)=0.030). The analysis result of the phosphor powder thus obtained is shown in table 1, and an SEM photograph (250 times) of the phosphor powder is shown in FIG. 1.

A composition analysis result of the phosphor thus obtained is estimated from an amount of atoms and the molar ratio of the constituent element. The result is close to the composition ratio of $Sr_4AlSi_{11}O_2N_{17}$:Eu with less oxygen than the composition calculated from the blending ratio. This is because the oxygen unnecessary for forming a higher-temperature stable phase becomes carbon dioxide gas and water vapor, or nitrogen oxide gas which is reacted with the nitrogen in the atmospheric air during firing, and released from the generated product. Therefore, it appears that less oxygen than that in the composition formula calculate from the blending ratio is obtained. The deviation other than the oxygen element is considered to be caused by a measurement error and impurities mixed-in during manufacturing the phosphor. In addition, a specific surface area of the phosphor powder thus obtained was 0.362 m²/g. Also, as clarified from FIG. 1(A), the phosphor powder thus obtained was the aggregates in which the primary particle of not more than 20 μm agglutinates. When the average particle size (D50) thus obtained was measured by a laser Doppler measurement method, it was found that D50 was 15.50 μm, satisfying a preferable range of the phosphor of not less than 1.0 μm and not more than 20.0 μm. The primary particle size observed by the SEM photograph was about 10.0 μm. Also, it is found that the aggregates of the phosphor powder contains the columnar particle, from an expanded SEM photograph shown in FIG. 1(B).

Next, the emission spectrum of the phosphor of the example 1 was measured. The measurement result was shown in table 2, and further described in FIG. 2.

Figure 2:
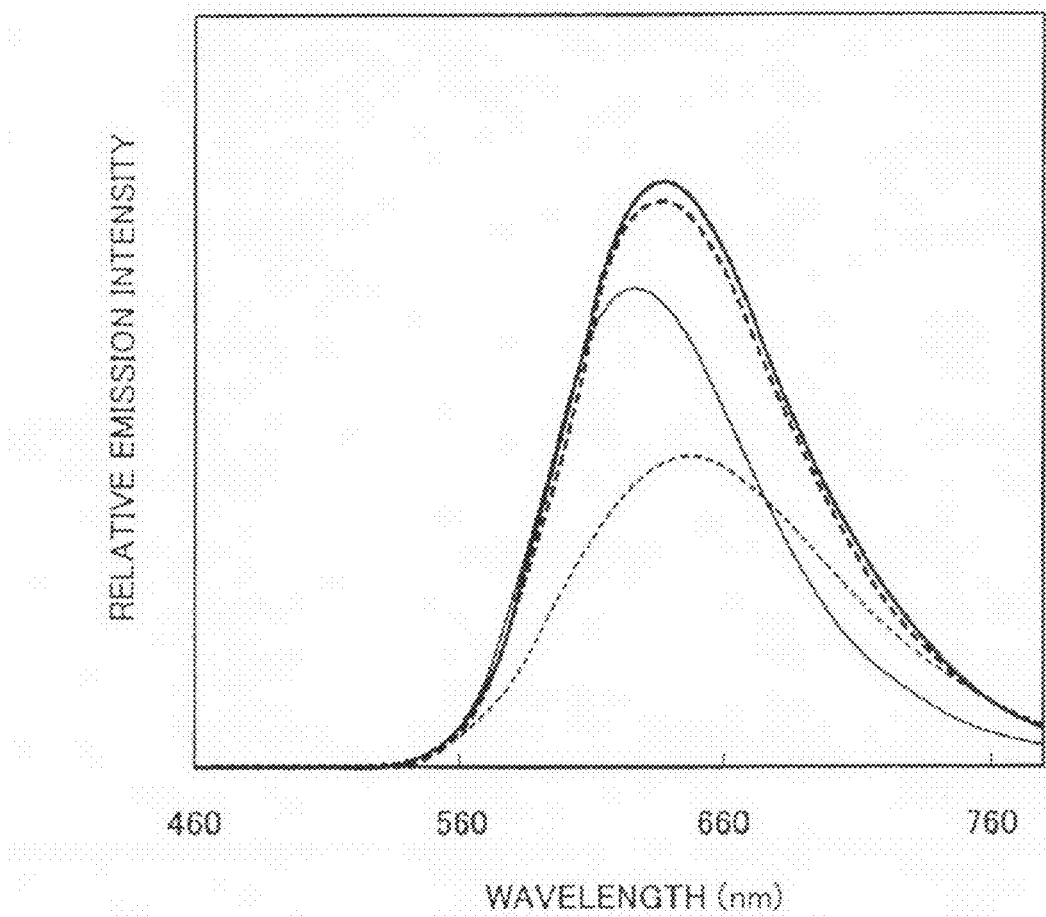
FIG. 2 is a graph showing an emission spectrum when phosphors of examples 1 and 2, and comparative examples 1 and 2 are irradiated with a monochromatic light of 460 nm wavelength.

FIG. 2 is a graph showing the emission intensity of the phosphor of the example 1 as the relative intensity taken on the ordinate axis, and the wavelength of the light taken on the abscissa axis. Here, the emission spectrum is the spectrum of the light released from the phosphor, when the phosphor is irradiated with the light or energy of the light with some wavelength. FIG. 2 is a view showing the spectrum of the light emitted from the phosphor when the phosphor of the example 1 is irradiated with the monochromatic light of 460 nm wavelength as the excitation light, by using thick solid line.

First, by using FIG. 2, the emission spectrum of the phosphor will be explained.

As clarified from the thick solid line of FIG. 2, the phosphor of the present invention had the emission spectrum with a broad peak in the wavelength range from 550 nm to 780 nm, and the peak wavelength was 637.0 nm. (wherein the relative intensity of the emission intensity and luminance was defined as 100%) In addition, the half value width was determined to be 98.2 nm. Chromaticity (x, y) of the emission spectrum was determined to be x=0.639 and y=0.356. Note that the powder exhibits a phosphor color from orange to red, and red emission color could be visually confirmed. The phosphor of the example 1 has the emission spectrum with an extremely broad peak of the half value width in a broad wavelength range, and therefore when used as a white LED illuminating phosphor, the white LED illumination having an excellent color rendering properties can be manufactured, compared to the case using the phosphor having the emission spectrum with a sharp peak. Further, in the case of the phosphor having the emission spectrum with a sharp peak, several kinds of phosphors are required to be mixed to improve the color rendering properties. However, the phosphor has the emission spectrum with a broad peak, and therefore the number of the kinds of the phosphor to be mixed can be made small, whereby the white LED illumination can be manufactured at a low cost.

Figure 3:
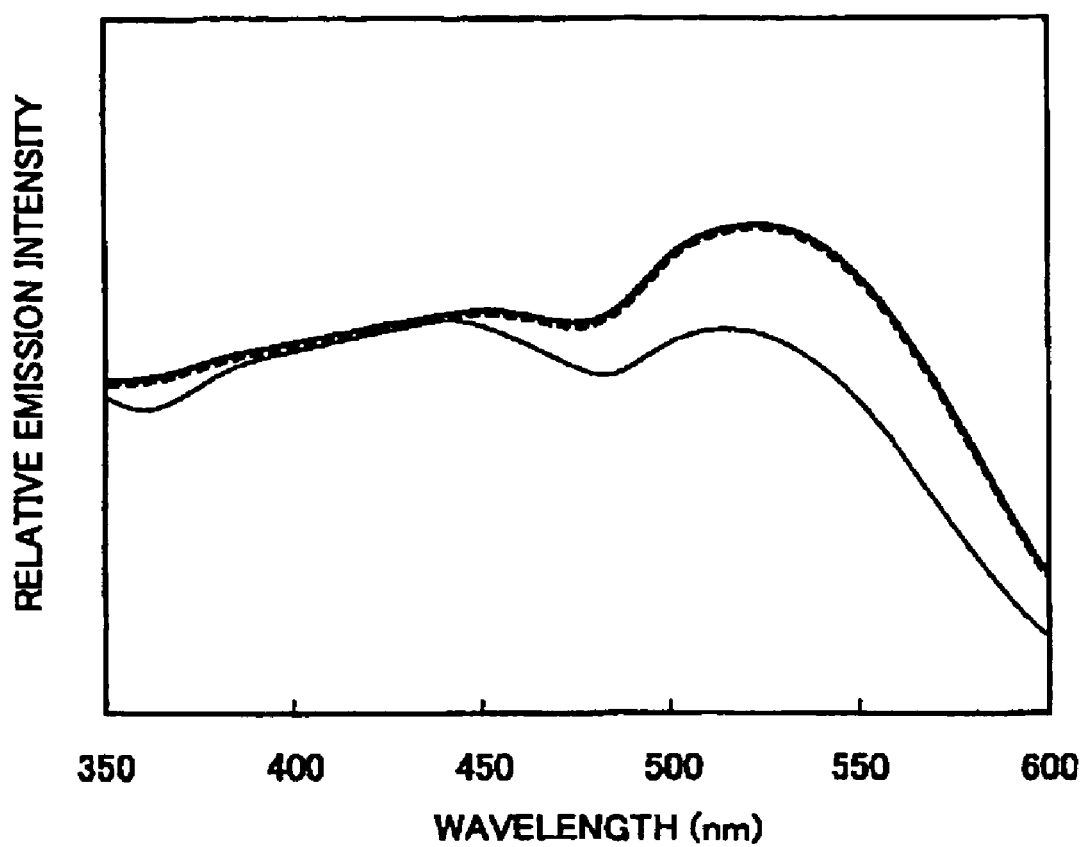
FIG. 3 is a graph showing an excitation spectrum of the phosphors of the examples 1 and 2, and the comparative example 1.

Next, by using FIG. 3, an excitation spectrum of the phosphor of the example 1 will be explained. FIG. 3 is a graph showing the emission intensity of the phosphor taken on the ordinate axis, and the wavelength of the excitation light taken on the abscissa axis. Here, the excitation spectrum is obtained by exciting the phosphor to be measured by using the monochromatic light of various wavelengths as the excitation light, measuring the emission intensity of a fixed wavelength emitted from the phosphor, and measuring an excitation wavelength dependency of the emission intensity. In this measurement, the phosphor of the example 1 is irradiated with the monochromatic light of the wavelength range from 350 nm to 600 nm, and the excitation dependency of the emission intensity of the light of 637.0 nm wavelength emitted from the phosphor is measured.

The thick solid line of FIG. 3 shows the excitation spectrum of the phosphor of the example 1. As clarified from the thick solid line of FIG. 3, it was found that the excitation spectrum of the phosphor of the present invention exhibits a red emission with high intensity, under the excitation of the light with broad wavelength from 350 nm to 600 nm. Particularly, this phosphor has a particularly excellent excitation band particularly in the vicinity of the wavelength 460 nm of the blue LED, and the wavelength 405 nm of the near ultraviolet/ultraviolet LED used as the excitation light for the one chiptype white LED illumination at present.

In the example and a comparative example also as will be explained hereafter, the maximum value of the emission spectrum is defined as 100% relative intensity, when the phosphor of the example 1 is irradiated with the monochromatic light of 460 nm as the excitation light.

TABLE 1

| | Sr (wt %) | Al (wt %) | Si (wt %) | O (wt %) | N (wt %) | Eu (wt %) | Ce (wt %) | OTHERS (wt %) | AVERAGE PARTICLE SIZE (μm) | SPECIFIC SURFACE AREA (m²/g) |
|---|---|---|---|---|---|---|---|---|---|---|
| EXAMPLE 1 | 38.00 | 2.66 | 28.90 | 4.69 | 22.50 | 2.05 | | 1.20 | 15.50 | 0.362 |
| EXAMPLE 2 | 38.10 | 3.43 | 27.84 | 4.74 | 22.50 | 2.39 | | 1.00 | 13.85 | 0.398 |
| EXAMPLE 3 | 38.20 | 3.26 | 26.40 | 4.32 | 24.60 | | 2.07 | 1.15 | 15.12 | 0.304 |
| COMPARATIVE EXAMPLE 1 | 36.20 | <0.01 | 31.30 | 0.77 | 27.70 | 2.14 | | 1.89 | 6.55 | 0.912 |

TABLE 2

| | | a/m | b/m | EMISSION WAVELENGTH (nm) | RELATIVE EMISSION INTENSITY (%) | CHROMATICITY x | CHROMATICITY y | LUMINANCE Y (%) |
|---|---|---|---|---|---|---|---|---|
| EXAMPLE 1 | | 0.25 | 2.75 | 637.0 | 100.0% | 0.639 | 0.356 | 100.0% |
| EXAMPLE 2 | | 0.25 | 2.50 | 637.0 | 99.8% | 0.641 | 0.355 | 94.4% |
| COMPARATIVE EXAMPLE 1 | | 0.00 | 2.50 | 625.9 | 80.3% | 0.630 | 0.363 | 90.1% |
| COMPARATIVE | SAMPLE 1 | 0.00 | 2.50 | 631.9 | 35.0% | 0.558 | 0.416 | 56.7% |

TABLE 2-continued

|  |  | a/m | b/m | EMISSION WAVELENGTH (nm) | RELATIVE EMISSION INTENSITY (%) | CHROMATICITY | | LUMINANCE |
|---|---|---|---|---|---|---|---|---|
|  |  |  |  |  |  | x | y | Y (%) |
| EXAMPLE 2 | SAMPLE 2 | 0.25 | 2.25 | 631.5 | 34.4% | 0.553 | 0.425 | 63.6% |
|  | SAMPLE 3 | 0.50 | 2.00 | 633.4 | 39.6% | 0.578 | 0.402 | 60.1% |
|  | SAMPLE 4 | 1.00 | 1.50 | 646.0 | 51.9% | 0.625 | 0.361 | 53.1% |
|  | SAMPLE 5 | 1.25 | 1.25 | 648.5 | 42.0% | 0.626 | 0.358 | 46.5% |
|  | SAMPLE 6 | 1.50 | 1.00 | 648.6 | 44.5% | 0.624 | 0.361 | 49.2% |
| EXAMPLE 3 |  | 0.25 | 2.75 | 559.7 | 100.0% | 0.393 | 0.532 | 147.5% |
| COMPARATIVE EXAMPLE 3 |  | 0.05 | 2.46 | 547.0 | 44.0% | 0.344 | 0.514 | 42.5% |

EXAMPLE 2

In the example 2, the phosphor of the example 2 is manufactured in the same way as the example 1, other than the molar ratio of each element of the example 1 which is set to Sr:Al:Si:Eu=0.970:0.25:2.5:0.030.

Commercially available $SrCO_3$ (3N), AlN (3N), $Si_3N_4$ (3N), and $Eu_2O_3$ (3N) were prepared, so that the molar ratio of each element becomes Sr:Al:Si:Eu=0.970:0.25:2.5:0.030. Then, each raw material was weighed to obtain 0.970 mol of $SrCO_3$, 0.25 mol of AlN, 2.5/3 mol of $Si_3N_4$, and 0.030/2 mol of $Eu_2O_3$, and the raw materials thus weighed were mixed by using the mortar in the atmospheric air. The raw materials thus mixed were put in the BN crucible, then the temperature was increased up to 1800° C. at 15° C./min under the furnace pressure of 0.05 MPa, and retained/fired for 3 hours at 1800° C. in the nitrogen atmosphere (in a flow state). Thereafter, the raw materials thus fired were cooled from 1800° C. to 200° C. for 1 hour, then a fired sample was pulverized up to a proper particle size in the atmospheric air by using the mortar, to obtain the phosphor according to an embodiment 2 expressed by the composition formula $Sr_4AlSi_{10}O_3N_{15}$:Eu (wherein Eu (Sr+Eu)=0.030). The analysis result of the phosphor powder thus obtained is shown in table 1.

The composition analysis result of the phosphor thus obtained was determined and estimated from the amount of atoms and the molar ratio of the constituent element in the same way as the example 1. The result was close to the composition ratio of $Sr_4AlSi_{10}O_3N_{15}$:Eu. A slight deviation is considered to be caused by a measurement error and impurities mixed-in during manufacturing the phosphor. In addition, a specific surface area of the phosphor powder thus obtained was 0.398 $m^2$/g, and the primary particle size observed by the SEM photography was about 9.8 μm, and the average particle size (D50) obtained by the laser Doppler measurement was 13.85 μm thus satisfying the preferable range of the phosphor of not less than 1.0 μm and not more than 20.0 μm.

Next, the emission spectrum of the phosphor of the example 2 was measured. The measurement result was shown in table 2, and further described in FIG. 2.

Thick broken line of FIG. 2 shows the measurement result of the emission spectrum when the phosphor is irradiated with the monochromatic light of the 460 nm wavelength as the excitation light. The phosphor had the emission spectrum with a broad peak in the wavelength range from 550 nm to 780 nm, and the peak wavelength was 637.0 nm. In addition, the half value width was determined to be 97.4 nm. Chromaticity (x, y) of the emission spectrum was determined to be x=0.641 and y=0.355. Note that the powder exhibits a phosphor color from orange to red, and red emission color could be visually confirmed.

Thick broken line of FIG. 3 shows the excitation spectrum of the phosphor of the example 2. In this measurement, the phosphor of the example 2 was irradiated with the monochromatic light with the wavelength range from 350 nm to 600 nm, and the excitation dependency of the emission intensity of the light of 637.0 nm wavelength emitted from the phosphor was measured. As clarified from the thick broken line of FIG. 3, in the same way as the example 1, it was found that the excitation spectrum of the phosphor of the present invention also exhibited the red light emission with high intensity under the excitation of the light with a broad wavelength range from 350 nm or around to 550 nm. In the example 2, the molar ratio of Si and N was a small composition compared to the example 1. However, the example 2 exhibited the excellent emission characteristics in the same way as the example 1.

EXAMPLE 3

In the example 3, in the phosphor expressed by the composition formula $Sr_4AlSi_{11}O_2N_{17}$:Eu of the phosphor of the example 1, Eu was replaced with Ce as the activator. Otherwise, in the same way as the example 1, the phosphor of the example 3 $Sr_4AlSi_{11}O_2N_{17}$:Ce was manufactured in the same way as the example 1. The molar ratio of each element is Sr:Al:Si:Ce=0.970:0.25:2.75:0.030, and each raw material was weighed to obtain 0.970 mol of $SrCO_3$, 0.25 mol of AlN, 2.75/3 mol of $Si_3N_4$, and 0.030 mol of $CeO_2$. The composition estimated from the raw material used and the blending ratio was given by $Sr_4AlSi_{11}O_2N_{17}$:Ce (wherein Ce/(Sr+Ce) =0.030). In the same way as the example 1, the analysis result of the phosphor powder thus obtained is shown in table 1.

A composition analysis result of the phosphor thus obtained was estimated from the amount of atoms and the molar ratio of the constituent element in the same way as the example 1. The result was close to the composition ratio of $Sr_4AlSi_{11}O_2N_{17}$:Ce. The specific surface area was 0.304 $m^2$/g, the primary particle size observed by the SEM photography was about 10.1 μm, and the average particle size (D50) measured by the laser Doppler measurement method was 15.12 μm. Even when Ce is set as the activator, the composition analysis result, the specific surface area, and the primary particle size observed by the SEM photography showed approximately the same result as that when Eu is used as the activator.

Next, the emission spectrum of the phosphor of the example 3 was measured. The measurement result is shown in table 2, and further the emission spectrum when the phosphor is irradiated with the light of 460 nm excitation wavelength is shown by solid line in FIG. 4.

Figure 4:
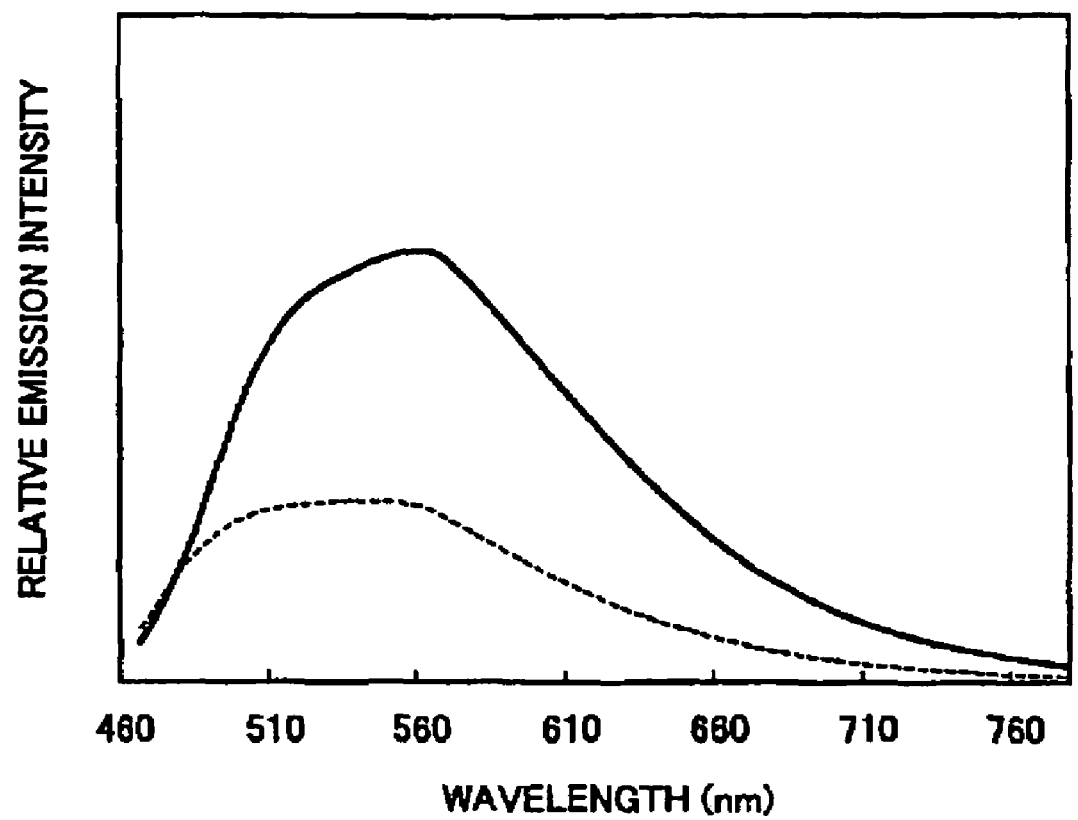
FIG. 4 is a graph showing an emission spectrum when the phosphors of an example 3 and comparative example 3 are irradiated with the monochromatic light of 460 nm wavelength.

Table 2 and FIG. 4 show the measurement result of the emission spectrum when the phosphor is irradiated with the monochromatic light of 460 nm wavelength as the excitation light. Table 2 and FIG. 4 reveal that the phosphor of 460 nm excitation wavelength has the emission spectrum with a broad peak in the broad wavelength range from 470 nm to 780 nm, and the peak wavelength was 559.7 nm. In addition, the half value width was determined to be 131.1 nm, and the chromaticity (x, y) of the emission spectrum was determined to be x=0.393, and y=0.532. Note that the powder was yellow color, and a yellow emission color could be visually confirmed.

Figure 5:
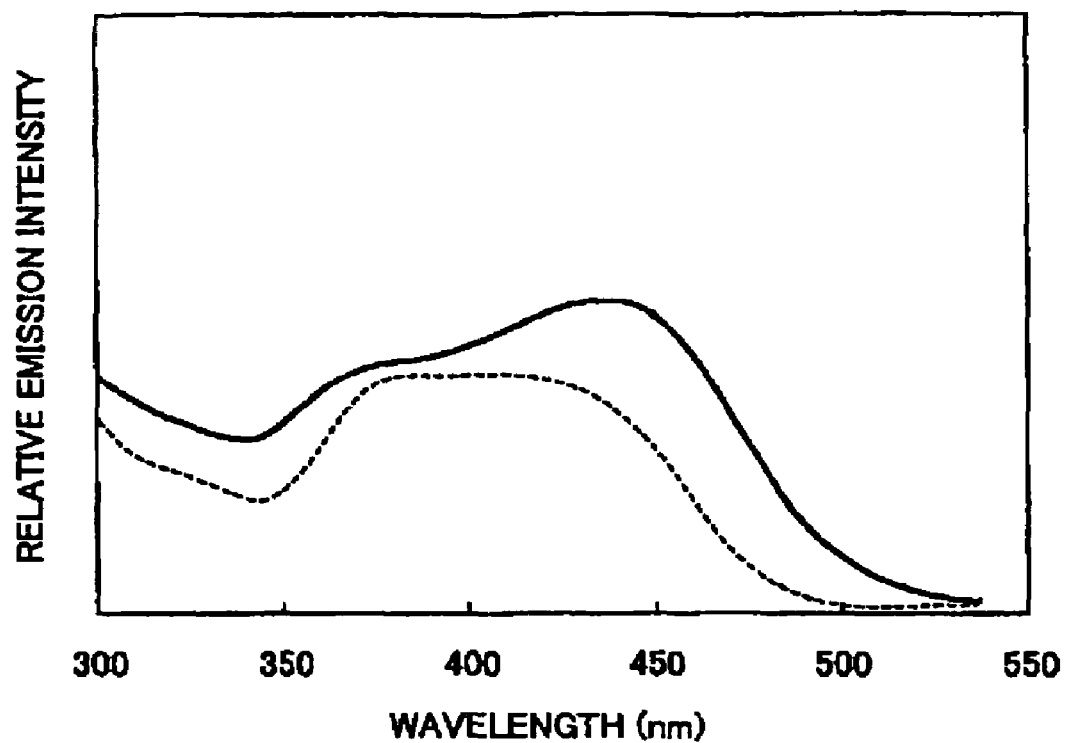
FIG. 5 is a graph showing the excitation spectrum of the phosphors of the example 3 and the comparative example 3.

Solid line of FIG. 5 shows the excitation spectrum of the phosphor of the example 3. Note that FIG. 5 shows the graph similar to that of FIG. 4. In this measurement, the phosphor of the example 3 was irradiated with the monochromatic light of the wavelength range from 300 nm to 540 nm, and the dependency of the emission intensity of the light of 559.7 nm wavelength emitted from the phosphor, on the excitation light wavelength was measured. The excitation spectrum of the phosphor revealed that the phosphor was excited by the excitation light with the wavelength range from 300 nm or around to 540 nm, and exhibited yellow light emission.

COMPARATIVE EXAMPLE 1

A silicon nitride-based phosphor expressed by the composition formula $Sr_2Si_5N_8$:Eu (wherein Eu/(Sr+Eu)=0.030) according to the patent documents 1 and 2 was prepared and defined as a comparative example 1.

The phosphor according to the comparative example 1 was prepared as will be described below.

The commercially available reagents of $Sr_3N_2$(2N), $Si_3N_4$ (3N), and $Eu_2O_3$(3N) were prepared as the raw materials. The molar ratio of each element was Sr:Si:Eu=1.94:5.0:0.06, and each raw material was weighed to obtain 1.94/3 mol of $Sr_3N_2$, 5.0/3 mol of $Si_3N_4$, and 0.06/2 mol of $Eu_2O_3$, and mixed by using the mortar in the glove-box under the nitrogen atmosphere, and the mixture thus obtained was fired in the nitrogen atmosphere at 1600° C. In regards to the latter manufacturing method, by using the same method as that of the example 1, a phosphor sample was manufactured.

Next, in the same way as the example 1, the emission spectrum of the phosphor of the comparative example 1 was measured. The measurement result thus obtained was shown in table 2 and by thin solid line in FIG. 2. As clarified from the thin solid line of FIG. 2, the phosphor of the comparative example 1 showed a broad emission spectrum. Also, as shown by the thin solid line of FIG. 3, the phosphor of the comparative example 1 showed the emission spectrum with a peak wavelength of 625.9 nm when the phosphor was irradiated with the light of 460 nm wavelength. When the relative intensity of the example 1 was defined as 100%, the relative intensity of the emission intensity was 80.3% in the comparative example 1. The relative intensity of the luminance was 90.1%, and the chromaticity (x, y) of the emission spectrum was x=0.630, and y=0.363. Note that red light emission could be visually confirmed.

COMPARATIVE EXAMPLE 2

Next, the phosphor expressed by the composition formula $Sr_2Al_xSi_{5-x}N_{8-x}O_x$:Eu according to the patent document 3 was prepared, and defined as a comparative example 2. In the comparative example 2, x is changed from 0 to 2.5, and the result is shown.

In the phosphor of the comparative example 2, when the composition ratio of Sr of each raw material of $SrCO_3$ (3N), AlN (3N), $Si_3N_4$ (3N), and $Eu_2O_3$ (3N) was set at 1 mol, the mixing ratio of AlN (3N) and $Si_3N_4$ (3N) was adjusted so that the composition ratio of Al+Si became 2.5, then the raw materials were mixed in the atmospheric air and thereafter fired at 1600° C. in the nitrogen atmosphere, whereby the phosphor sample was manufactured. The emission intensity and luminance of the phosphor after manufacture was similarly measured. However, the blending ratio of Al and Sr thus adjusted is set to Al:Si=0.0:2.50 (sample 1), Al:Si=0.25:2.25 (sample 2), Al:Si=0.50:2.00 (sample 3), Al:Si=1.00:1.50 (sample 4), Al:Si=1.25:1.25 (sample 5), and Al:Si=1.50:1.00 (sample 6).

Figure 6:
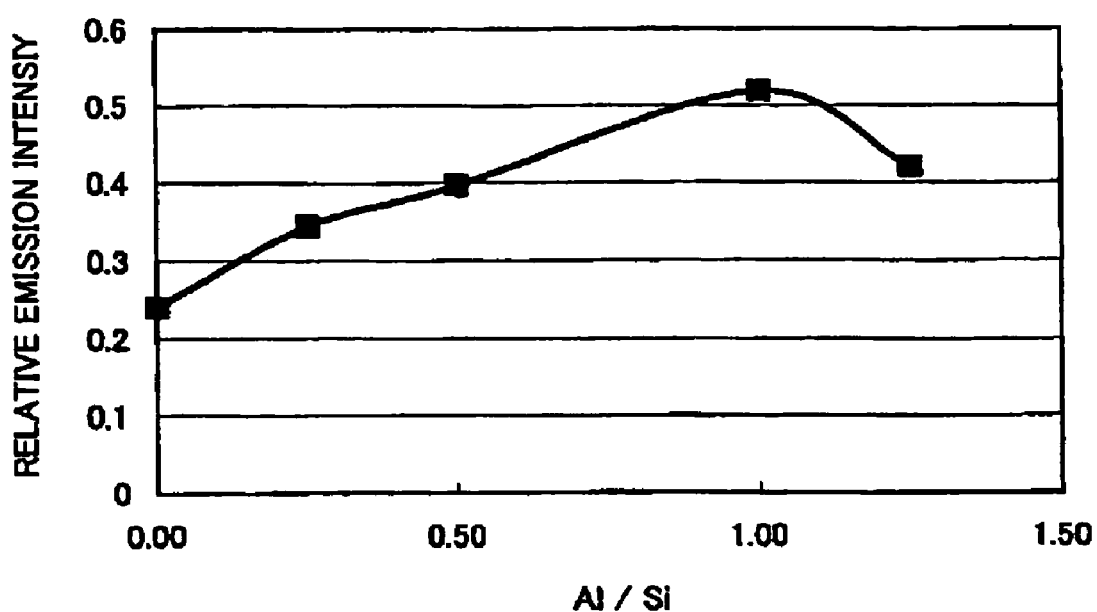
FIG. 6 is a graph showing the relation between Al/Si ratio and an emission intensity, in the phosphor of the comparative example 2.

The measurement result is shown in table 2, FIG. 2, and FIG. 6. Here, the spectrum shown in FIG. 2 shows the spectrum of the sample 4 by thin broken line, and FIG. 6 is the graph showing the relative intensity of the emission intensity of each of the aforementioned phosphor sample taken on the ordinate axis, and the value of Al/Si, which is the blending ratio of Al and Si taken on the abscissa axis. Note that in regards to the emission intensity and luminance, the emission intensity of the example 1 was defined as 100%. Also, the light of 460 nm wavelength was used as the excitation light.

As clarified from the result of table 2, in association with the increase in the ratio of Al/Si, the improvement in the emission intensity is observed. However, even in the sample 4 with highest emission intensity, the result was that 50% of the emission intensity of the example 1 was exhibited. In addition, an emission peak wavelength was apt to be shifted to the longer wavelength side of the light emission, in association with the increase in the ratio of Al/Si.

<Study on the Examples 1 and 2, and the Comparative Examples 1 and 2>

The phosphors having a new composition of the example 1, example 2, and the example 3 are different from the silicon nitride-based phosphor of the comparative example 1, and contain Al and oxygen in the constituent element. When excited by the light of 460 nm wavelength, the phosphors of the examples 1 and 2 have 20% higher emission intensity than that of the phosphor of the comparative example 1, and have the emission spectrum with a peak on 10 nm or more longer wavelength side. Since the emission wavelength of the phosphor is attributable to the composition/crystal structure thereof, the phosphors of the examples 1 and 2 are different from the conventional silicon nitride-based phosphor shown in the comparative example 1. In addition, when compared with the phosphor of the comparative example 1, since an extremely oxidizable alkaline earth metal nitride ($M_3N_2$) is not used, an advantage is that the raw material can be treated in the atmospheric air, thereby having an excellent productivity when manufacturing the phosphor.

In addition, the phosphor expressed by the composition formula $Sr_2Al_xSi_{5-x}N_{8-x}O_x$:Eu shown in the comparative example 2 contains Al and oxygen in the composition formula and is extremely close to the phosphor composition shown in the example 1. However, the comparative example 2 is largely different from the example 1 in the emission intensity. It appears that this difference is generated from different constitution ratios of Si, Al, and oxygen. As the analysis result of the composition, or as shown in an X-ray diffraction pattern as will be described later, the phosphor of the example 1 is considered to be different from the phosphor of the comparative example 2 expressed by the composition formula $Sr_2Al_xSi_{5-x}N_{8-x}O_x$:Eu.

COMPARATIVE EXAMPLE 3

The phosphor expressed by the composition formula $Sr_2Si_{4.91}Al_{0.09}N_8$:Ce (wherein Ce/(Sr+Ce)=0.045) according to the conventional art was prepared and defined as a comparative example 3. The phosphor of the comparative example 3 was prepared as will be described below.

The commercially available reagents of $Sr_3N_2$ (2N), $Si_3N_4$ (3N), $Al_2O_3$ (3N), and $CeO_2$ (3N) were prepared as the raw materials. The molar ratio of each element was Sr:Al:Si:Ce=1.91:0.09:4.91:0.09, and each element was weighed to obtain 1.91/3 mol of $Sr_3N_2$, 0.09 mol of AlN, 4.91/3 mol of $Si_3N_4$, and 0.09 mol of $CeO_2$, and mixed by using the mortar in the glove-box under the nitrogen atmosphere, and the mixture thus obtained was fired in the nitrogen atmosphere at 1400° C. for 4 hours. In regards to the latter manufacturing method, by using the same method as that of the example 1, the phosphor sample was manufactured.

Next, in the same way as the example 1, the emission spectrum of the phosphor of the comparative example 3 was measured. The measurement result thus obtained was shown in table 2 and by broken line in FIG. 4. As clarified from the broken line of FIG. 4, the phosphor of the comparative example 3 showed a broad emission spectrum. Also, as shown by the broken line of FIG. 4, the phosphor of the comparative example 3 showed the emission spectrum with a peak wavelength of 547.0 nm when the phosphor was irradiated with the light of 460 nm wavelength. When the relative intensity and the luminance of the example 3 were defined as 100%, the relative intensity of the emission intensity of the comparative example 3 was 44.0%. The relative intensity of the luminance was 42.5%, and the chromaticity (x, y) of the emission spectrum was x=0.344, and y=0.514. Note that yellow light emission could be visually confirmed.

The emission intensity of the sample prepared in the example 3 is improved as much as twice that of the comparative example 3, thus providing an extremely improved phosphor. The sample of the example 3 has the emission spectrum with a peak between 410 nm and 460 nm of the wavelength compared to the comparative example 3. Therefore, an improved light emission can be obtained when the phosphor is irradiated with the light of the 450 nm to 470 nm wavelength, which is the emission wavelength of the blue LED. This is because the emission intensity is improved by optimizing the concentration of Al and oxygen in the sample of the example 3. In addition, in the sample of the example 3, since an extremely oxidizable alkaline earth metal nitride ($M_3N_2$) is not used, the raw materials can be treated in the atmospheric air, and ammonia is not used. Therefore, productivity for manufacturing the phosphor is excellent.

<Comparison by Powder X-ray Diffraction Measurement>

Figure 7A:
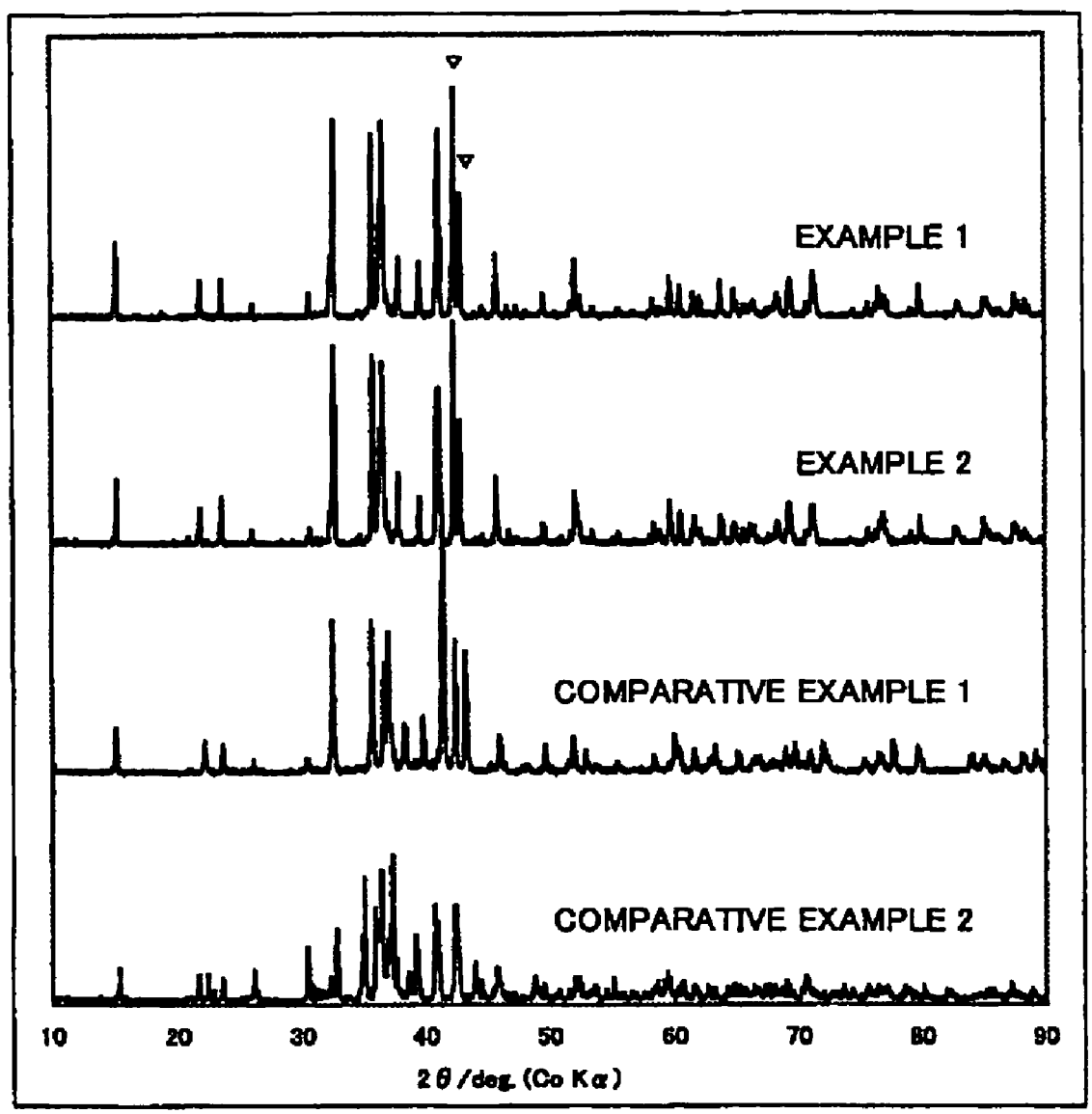
FIG. 7A is a graph showing a powder X-ray diffraction pattern by a CoKα ray, of each phosphor of the examples 1, 2, 8, and the comparative examples 1 and 2.
Figure 7B:
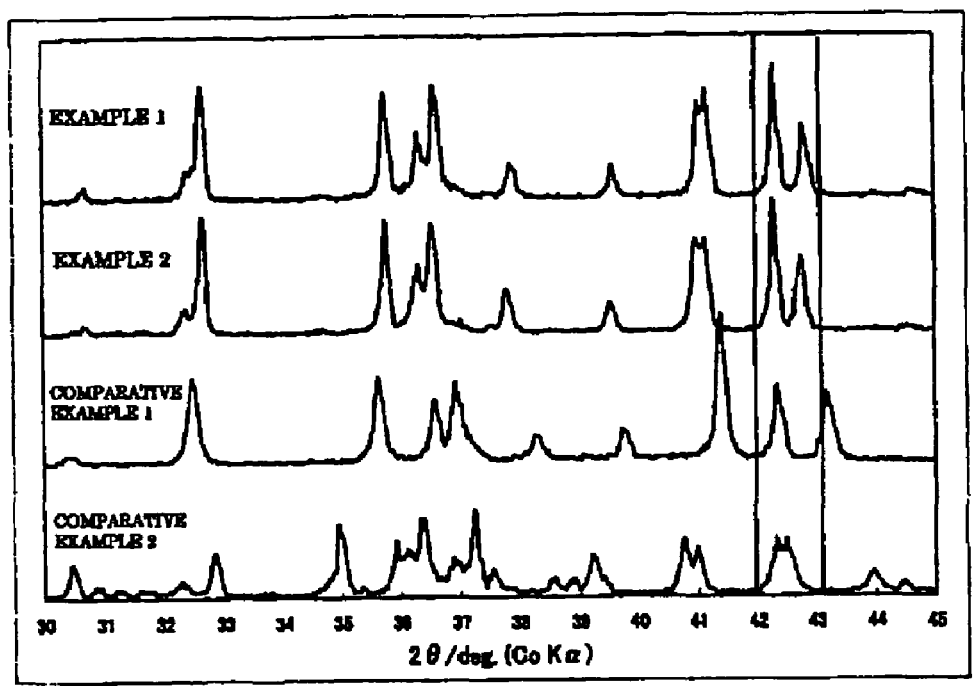
FIG. 7B is a graph expanding a part of FIG. 7A.

Powder X-ray diffraction measurement was performed in the examples 1 and 2, comparative example 1, the sample 2 of the comparative example 2, and the example 8 as will be described later. The powder x-ray diffraction pattern of each phosphor sample is shown in FIG. 7(A), and an expanded view in which a part of the powder X-ray diffraction pattern is expanded, is shown in FIG. 7(B).

Here, a measurement method of the X-ray diffraction pattern by a powder method of the phosphor will be explained.

The phosphor to be measured was pulverized up to a predetermined average particle size (preferably 1.0 μm to 20.0 μm) by using pulverizing means such as the mortar and the ball mill after firing, and a holder made of titanium was filled with the phosphor thus pulverized to form a flat surface, then the phosphor was measured by an XRD apparatus, "RINT 2000" by RIGAKU DENKI CO., LTD. Measurement conditions are described below.

Used measuring apparatus: "RINT 2000" by RIGAKU DENNKI CO., LTD.
X-ray tube bulb: CoKα
Tube voltage: 40 kV
Tube current: 30 mA
Scanning method: 2θ/θ
Scanning speed: 0.3°/min
Sampling interval: 0.01°
Start angle (2θ): 10°
Stop angle (2θ): 90°

It appears that the deviation of the Bragg angle (2θ) is generated by factors such as an unflat sample face irradiated with X-ray, a measurement condition of the X-ray, and particularly difference in the scanning speed. Therefore, it appears that a slight deviation is allowable in the range where a diffraction peak is observed. In order to restrain such a deviation, the scanning speed is set at 0.3°/min, and in this condition, Si is mixed in the phosphor sample, and the deviation of Si peak is corrected after X-ray measurement, to thereby determine a Bragg angle (2θ) and an inter-lattice distance (d).

As shown in FIG. 7(A) and FIG. 7(B), the X-ray diffraction pattern of the product phase of each phosphor is compared. The result is that the diffraction pattern is different between the example 1, 2 and the comparative example 2, and this reveals that a different phase is generated. A close diffraction pattern is obtained for the example 1, 2 and the comparative example 1, and both diffraction patterns are analyzed. The result is that the diffraction peaks caused by unreacted raw materials are not observed in both diffraction patterns, and it appears that both samples are generated with a single phase. The diffraction peaks are totally shifted, and a slight difference is observed on the low angle side, but a different diffraction pattern is observed toward the wide angle side. Particularly, two diffraction rays having 30% or more relative intensity with respect to the relative intensity of the maximum peak in the range of 42.0 to 43.1° (the range of d=2.496 to 2.435) of the Bragg angle (2θ) is not observed in the diffraction pattern of the comparative example 1. Further, a characteristic diffraction pattern different from the comparative example 1 is observed in the vicinity of the range of 32.0 to 33.5° and 40.8 to 41.4° of the Bragg angle (2θ).

The constitution was analyzed for both diffraction patterns thus obtained in the examples 1 and 2. The result was that both of them had the orthorhombic crystal structure, and further although a sufficient analysis was not performed because of a different composition to be compared, a simulation analysis based on the structure of $Sr_2Si_5N_8$ revealed that the phosphor obtained in the examples 1 and 2 had a larger crystal lattice volume than the crystal structure of $Sr_2Si_5N_8$ obtained in the comparative example 1, wherein the a-axis and the c-axis were extended, and the b-axis was shrunk. This shows that the crystal structure changes to different structure from $Sr_2Si_5N_8$ by solid solution of Al atom and O atom, to have the shortened atomic distance around Sr site due to the shrinkage of b-axis. And this change causes the emission peak on the longer wavelength side than that of $Sr_2Si_5N_8$. Therefore, two diffraction rays with Bragg angle (2θ) in the range from 42.0 to 43.5° are brought close to each other, and both of the diffraction rays with Bragg angle in the range from 32.0 to 33.5° and from 40.8 to 41.4° has the diffraction peak split toward the lower angle side. Therefore, in order to obtain the emission peak on the longer wavelength side, preferably the aforementioned conditions should be satisfied.

The study on the detailed condition of the composition formula shown in the examples 1 and 2 was performed, and the result will be shown hereafter.

EXAMPLE 4

Study on Eu Amount of Activation

In the example 4, in the same way as the example 1, the change of the emission intensity and luminance was measured, when the concentration of the activator element Z (Eu) was changed in the phosphor expressed by the composition formula $Sr_4AlSi_{11}O_2N_{17}$:Eu. Here, in the manufacture of a measurement sample, a raw material mixing ratio of Sr and Eu was adjusted, so that the relation of the activator Eu and Sr satisfies m+z=1. Then, as explained in the example 1, the mixing ratio of each raw material of $SrCO_3$ (3N), AlN (3N), $Si_3N_4$ (3N), and $Eu_2O_3$ (3N) was adjusted, the phosphor sample was prepared in the same way as the example 1, and the emission intensity and luminance of the phosphor thus prepared was measured. The concentration of the activator element Eu of Eu/(Sr+Eu) was set at 0.005 (sample 1), 0.010 (sample 2), 0.030 (sample 3, (sample 3, example 1)), 0.050 (sample 4), and 0.100 (sample 5).

Figure 8:
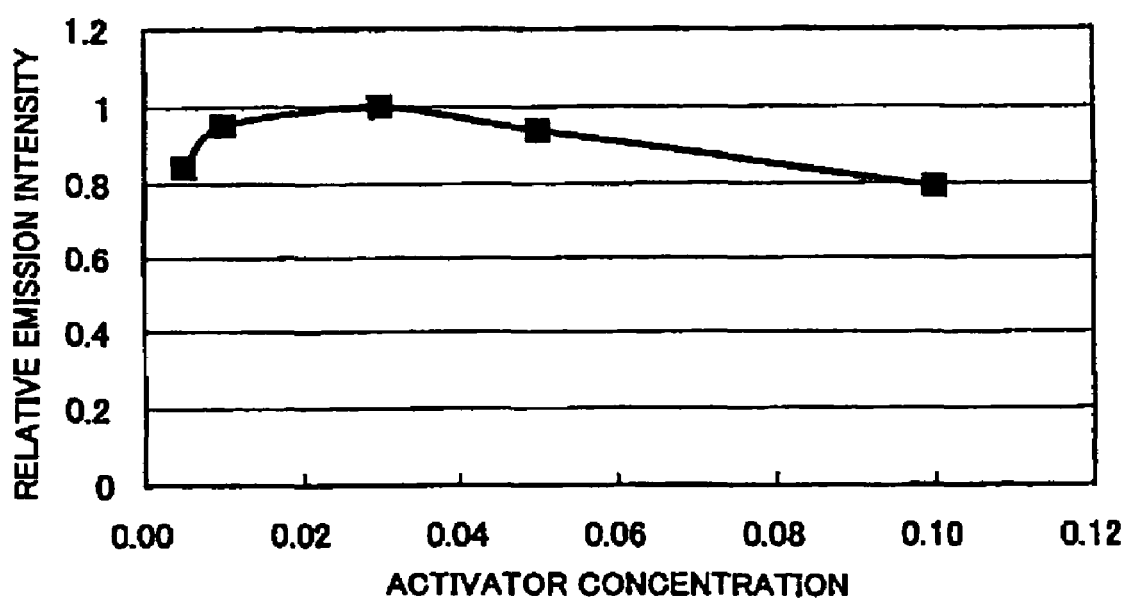
FIG. 8 is a graph showing the relation between a concentration of an activator Z (Eu) and the emission intensity, in the phosphor of the example 4.

The measurement result is shown in table 3 and FIG. 8. Here, FIG. 8 is a graph showing the relative intensity of the emission intensity of each of the phosphor samples taken on the ordinate axis, and the value of Eu/(Sr+Eu), which is the mixing ratio of Sr and Eu taken on the abscissa axis. Note that in the emission intensity and luminance, the value of the emission intensity in the peak wavelength of Eu/(Sr+Eu)=0.030 (sample 3) was defined as 100%. Note that the light of 460 nm wavelength was used as the excitation light.

As clarified from the result of table 3 and FIG. 8, in the region where the value of Eu/(Sr+Eu) is small, as the value of the Eu/(Sr+Eu) is increased, the emission intensity and luminance is increased accordingly. However, the emission intensity and luminance is decreased as the value of Eu/(Sr+Eu) is increased, with a peak in the vicinity of Eu/(Sr+Eu)=0.030. This is because an activator element is insufficient in a part smaller than Eu/(Sr+Eu)=0.030, and therefore the concentration quenching caused by the activator element is observed in the part where the value of Eu/(Sr+Eu) is larger than Eu/(Sr+Eu)=0.050.

Meanwhile, as clarified from the result of table 3, it was confirmed that as the value of Eu/(Sr+Eu) was increased, the value of the peak wavelength was shifted toward the longer wavelength side. Note that in parallel to the measurement of the emission intensity and luminance, the chromaticity (x, y) of the emission spectrum was measured, and the result is shown in Table 3.

EXAMPLE 5

Study on Ce Amount of Activation

In the example 5, in the same as the example 3, the change of the emission intensity and luminance was measured, when the concentration of the activator element Z (Ce) was changed, in the phosphor expressed by the composition formula $Sr_4AlSi_{11}O_2N_{17}$:Ce. Here, in the manufacture of the measurement sample, in the same way as the example 4, the raw material mixing ratio was adjusted, so that the relation of the activator Ce and Sr satisfies m+z=1. Then, the phosphor sample was prepared in the same way as the example 1, excepting that the mixing ratio of each raw material $SrCO_3$ (3N), AlN (3N), $Si_3N_4$ (3N), and $CeO_2$ (3N) explained in the example 1 was adjusted and the concentration of Ce activation was changed, and the emission intensity and luminance of the phosphor thus prepared was measured. However, the concentration of Ce activation, Ce/(Sr+Ce) was set to 0.010 (sample 1), 0.030 (sample 2, (example 3)), 0.050 (sample 3), and 0.100 (sample 4).

Figure 9:
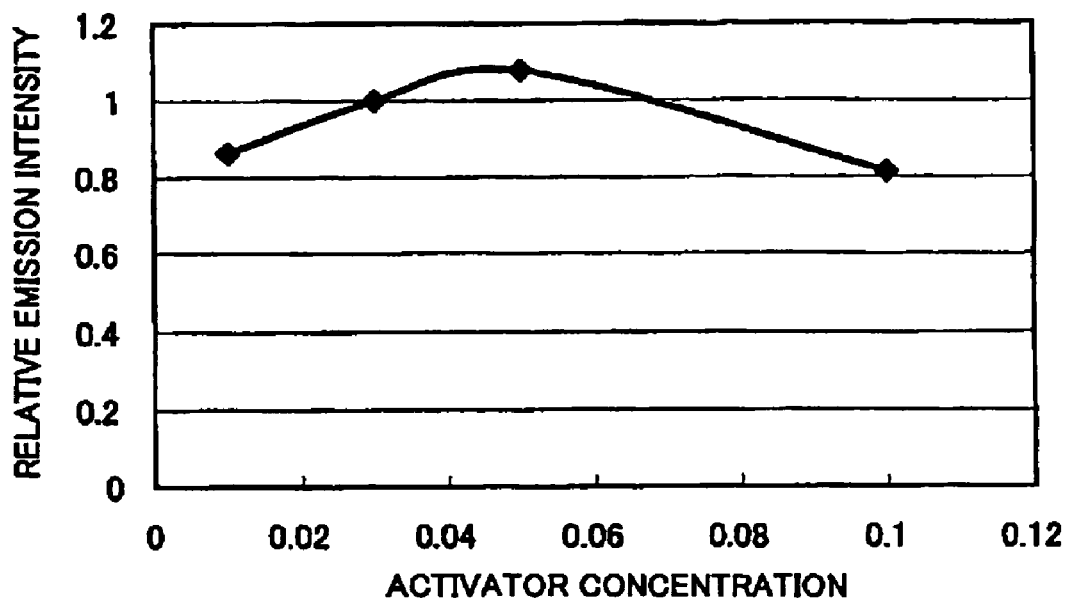
FIG. 9 is a graph showing the relation between the concentration of the activator Z (Ce) and the emission intensity, in the phosphor of the example 5.

The measurement result is shown in table 3 and FIG. 9. Here, FIG. 9 is a graph showing the relative intensity of the emission intensity of each of the phosphor samples taken on the ordinate axis, and the value of Ce/(Sr+Ce), which is the mixing ratio of Sr and Ce, is taken on the abscissa axis as the concentration of the activator. Note that in the emission intensity and luminance, the value of the emission intensity in the peak wavelength of Ce/(Sr+Ce)=0.030 (sample 2) was defined as 100%, and the light of 460 nm wavelength was used as the excitation light.

As clarified from the result of the table 3 and FIG. 9, in a region where the value of Ce/(Sr+Ce) is small, as the value of the Ce (Sr+Ce) is increased, the emission intensity and luminance is increased accordingly. However, the emission intensity and luminance is decreased as the value of Ce/(Sr+Ce) is increased, with a peak in the vicinity of Ce/(Sr+Ce)=0.050. This is because an activator element is insufficient in a part where the value of Ce/(Sr+Ce) is smaller than Ce/(Sr+Ce)=0.050, and therefore the concentration quenching caused by the activator element is observed in the part where the value of Ce/(Sr+Ce) is larger than Ce/(Sr+Ce)=0.050. However, the decrease of the emission intensity by the concentration quenching in the region, where the concentration of activation is high, is slow, compared to the case of changing Eu-activa-

TABLE 3

| | | Z | Z/(Sr + Z) | EMISSION WAVELENGTH (nm) | RELATIVE EMISSION INTENSITY (%) | CHROMATICITY x | CHROMATICITY y | LUMINANCE Y (%) |
|---|---|---|---|---|---|---|---|---|
| EXAMPLE 4 | SAMPLE 1 | Eu | 0.01 | 619.8 | 84.1% | 0.605 | 0.387 | 121.6% |
| | SAMPLE 2 | Eu | 0.01 | 624.3 | 95.0% | 0.618 | 0.376 | 122.9% |
| | SAMPLE 3 | Eu | 0.03 | 637.0 | 100.0% | 0.639 | 0.356 | 100.0% |
| | SAMPLE 4 | Eu | 0.05 | 642.5 | 93.8% | 0.650 | 0.345 | 80.0% |
| | SAMPLE 5 | Eu | 0.1 | 656.1 | 79.1% | 0.662 | 0.332 | 52.4% |
| EXAMPLE 5 | SAMPLE 1 | Ce | 0.01 | 554.3 | 86.4% | 0.392 | 0.515 | 134.3% |
| | SAMPLE 2 | Ce | 0.03 | 559.7 | 100.0% | 0.393 | 0.532 | 147.5% |
| | SAMPLE 3 | Ce | 0.05 | 564.8 | 107.9% | 0.423 | 0.525 | 153.2% |
| | SAMPLE 4 | Ce | 0.1 | 566.9 | 81.4% | 0.425 | 0.526 | 130.4% | tion concentration of the example 4. This is considered to be caused by the difference in ion radius and valency of Eu and Ce.

Meanwhile, as clarified from the result of the table 3, in association with the increase in the value of Ce/(Sr+Ce), the value of the peak wavelength was confirmed to be shifted toward the longer wavelength side.

Note that in parallel to the measurement of the emission intensity and luminance, the chromaticity (x. y) of the emission spectrum was measured.

EXAMPLE 6

Change of a/m Ratio

In the example 6, the emission intensity and luminance was measured when the molar ratio of Sr and Si was fixed to 1 and 2.75 respectively, and a/m ratio (here, a/m and Al/Sr have the same meaning) was changed, in the phosphor expressed by the mixing composition formula $SrAl_aSi_{2.75}O_oN_n:Eu$ (Eu/(Sr+Eu)=0.030, satisfying o<1.0, n=2/3m+a+4/3b−2/3o, m=1, b=2.75). Here, in the manufacture of the measurement sample, the phosphor sample was prepared in the same way as the example 1, excepting that the mixing ratio of only AlN (3N) out of each raw material of $SrCO_3$ (3N), AlN (3N), $Si_3N_4$ (3N), and $Eu_2O_3$ (3N) explained in the example 1 was adjusted, and the emission intensity and luminance of the phosphor thus prepared was measured. The blending ratio (a/m) of Al and Sr thus adjusted was set to Al/Sr=0 (sample 1), Al/Sr=0.06 (sample 2), Al/Sr=0.125 (sample 3), Al/Sr=0.25 (sample 4), Al/Sr=0.33 (sample 5), Al/Sr=0.50 (sample 6), Al/Sr=1.00 (sample 7), Al/Sr=1.50 (sample 8), and Al/Sr=2.00 (sample 9).

Further, the molar ratio of Sr and Si was fixed to 1 and 2.50 respectively, and the change of the emission intensity and luminance was measured when the a/m ratio was changed in the mixing composition formula $SrAl_aSi_{2.50}O_oN_n$:Eu. The blending ratio (a/m) of Al and Sr thus adjusted was set to Al/Sr=0 (sample 10), Al/Sr=0.06 (sample 11), Al/Sr=0.125 (sample 12), Al/Sr=0.25 (sample 13), Al/Sr=0.33 (sample 14), Al/Sr=0.50 (sample 15), Al/Sr=1.00 (sample 16), and Al/Sr=2.00 (sample 17).

Figure 10:
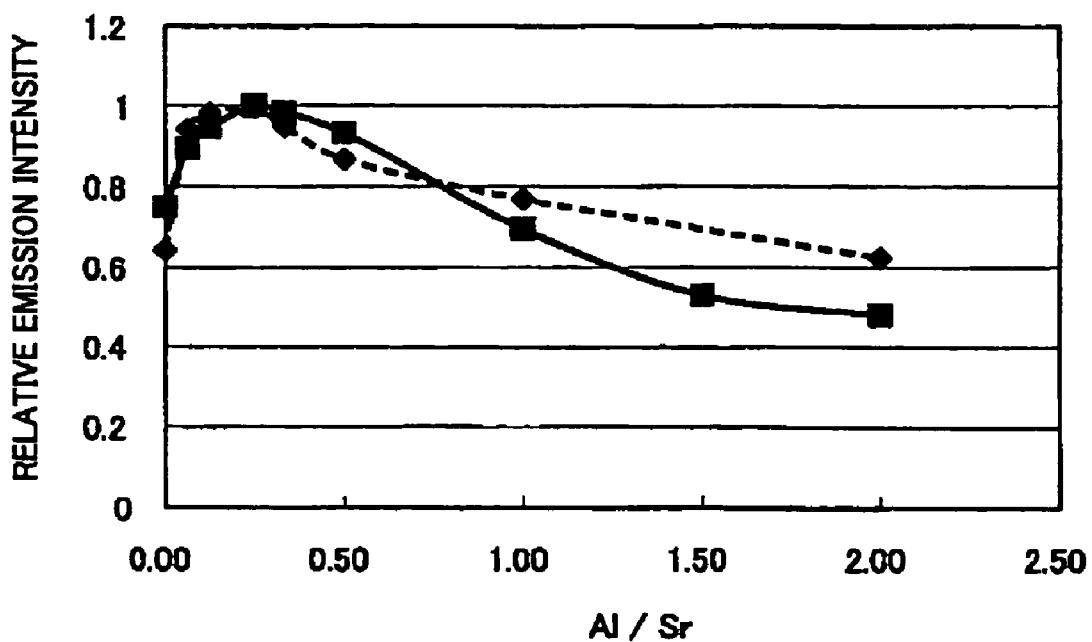
FIG. 10 is a graph showing the relation between Al/Sr ratio and the emission intensity, in the phosphor of the example 6.

The measurement result is shown in table 4 and FIG. 10. Here, FIG. 10 is a graph showing the relative intensity of the emission intensity of each of the phosphor samples taken on the ordinate axis, and the blending ratio Al/Sr of Sr and Al taken on the abscissa axis. The sample having the molar ratio (b/m) of Si set at 2.75 is shown by solid line, and the sample having the molar ratio (b/m) of Si set at 2.50 is shown by broken line. Note that in the emission intensity and luminance, the value of the emission intensity in the peak wavelength of Al/Sr=0.25 (sample 4) was defined as 100%. Then, the result of adjusting the value of Al/Sr up to 0.0 to 2.00 is shown. Note that the light of 460 nm wavelength was used as the excitation light.

As clarified from the result of table 4 and FIG. 10, the emission intensity and luminance is increased as the value of Al/Sr is increased, in the region where the value of Al/Sr is small. However, the emission intensity and luminance is decreased, with a peak in the vicinity of Al/Sr=0.25 (sample 4). Therefore, preferably the value of Al/Sr is in the range satisfying 0<Al/Sr<2.0.

This is because deviation from the vicinity of Al/Sr=0.25 causes the unreacted raw material to be remained in the phosphor after firing, and the phase different from a presently emitting phase to be generated.

Also, an X-ray diffraction peak intensity is deteriorated when Al/Sr is not less than 1.0. This causes the crystallinity of a matrix constitution of the phosphor to be deteriorated, and further the structure suitable for light emission to be collapsed, resulting in generating an impurity phase not contributing to the light emission. For this reason, when the value of Al/Sr is deviated from Al/Sr=1.0, the emission intensity and luminance is deteriorated. When the deviation is small, the influence is also small. Therefore, further preferably 70% or more emission intensity and luminance of Al/Sr=0.25 can be exhibited when the value of Al/Sr satisfies 0<Al/Sr<1.0.

TABLE 4

| | | a/m | b/m | EMISSION WAVELENGTH (nm) | RELATIVE EMISSION INTENSITY (%) | CHROMATICITY x | y | LUMINANCE Y (%) |
|---|---|---|---|---|---|---|---|---|
| EXAMPLE 6 | SAMPLE 1 | 0.00 | 2.75 | 637.5 | 74.9% | 0.612 | 0.380 | 98.9% |
| | SAMPLE 2 | 0.06 | 2.75 | 633.4 | 89.4% | 0.642 | 0.352 | 88.3% |
| | SAMPLE 3 | 0.13 | 2.75 | 633.4 | 94.7% | 0.641 | 0.354 | 89.8% |
| | SAMPLE 4 | 0.25 | 2.75 | 637.0 | 100.0% | 0.639 | 0.356 | 100.0% |
| | SAMPLE 5 | 0.33 | 2.75 | 637.5 | 98.4% | 0.639 | 0.356 | 90.5% |
| | SAMPLE 6 | 0.50 | 2.75 | 640.0 | 93.3% | 0.638 | 0.358 | 88.6% |
| | SAMPLE 7 | 1.00 | 2.75 | 639.0 | 70.1% | 0.621 | 0.369 | 73.9% |
| | SAMPLE 8 | 1.50 | 2.75 | 638.1 | 53.0% | 0.609 | 0.373 | 60.3% |
| | SAMPLE 9 | 2.00 | 2.75 | 637.5 | 48.0% | 0.612 | 0.368 | 52.7% |
| | SAMPLE 10 | 0.00 | 2.50 | 631.4 | 64.3% | 0.638 | 0.353 | 62.0% |
| | SAMPLE 11 | 0.06 | 2.50 | 631.4 | 94.2% | 0.638 | 0.358 | 92.4% |
| | SAMPLE 12 | 0.13 | 2.50 | 631.4 | 98.3% | 0.639 | 0.360 | 92.7% |
| | SAMPLE 13 | 0.25 | 2.50 | 637.0 | 99.8% | 0.640 | 0.359 | 91.5% |
| | SAMPLE 14 | 0.33 | 2.50 | 637.6 | 94.9% | 0.640 | 0.355 | 88.1% |
| | SAMPLE 15 | 0.50 | 2.50 | 641.2 | 86.6% | 0.627 | 0.366 | 81.3% |
| | SAMPLE 16 | 1.00 | 2.50 | 641.5 | 76.8% | 0.579 | 0.364 | 79.1% |
| | SAMPLE 17 | 2.00 | 2.50 | 641.2 | 62.4% | 0.552 | 0.366 | 77.3% |

EXAMPLE 7

Change of b/m Ratio

In the example 7, the molar ratio of Sr and Al was fixed to 1 and 0.25 respectively and the change of the emission intensity and luminance was measured when the b/m ratio (here, the b/m and Si/Sr have the same meaning.), in the phosphor expressed by the mixing composition formula $SrAl_{0.25}Si_bO_oN_n$:Eu (Eu/(Sr+Eu)=0.030, satisfying o<1.0, n=2/3m+a+4/3b−2/3o, m=1, a=0.25). Here, in the manufacture of the measurement sample, the phosphor sample was prepared in the same way as the example 1, excepting that the mixing ratio of only $Si_3N_4$ (3N) out of each raw material of $SrCO_3$ (3N), AlN (3N), $Si_3N_4$ (3N), and $Eu_2O_3$ (3N) explained in the example 1 was adjusted, and the emission intensity and luminance of the phosphor thus prepared was measured. However, the blending ratio (b/m) of Si and Sr thus adjusted was set to Si/Sr=1.50 (sample 1), Si/Sr=2.00 (sample 2), Si/Sr=2.25 (sample 3), Si/Sr=2.50 (sample 4), Si/Sr=2.75 (sample 5), Si/Sr=3.00 (sample 6), Si/Sr=3.50 (sample 7), Si/Sr=4.00 (sample 8), and Si/Sr=4.50 (sample 9).

Figure 11:
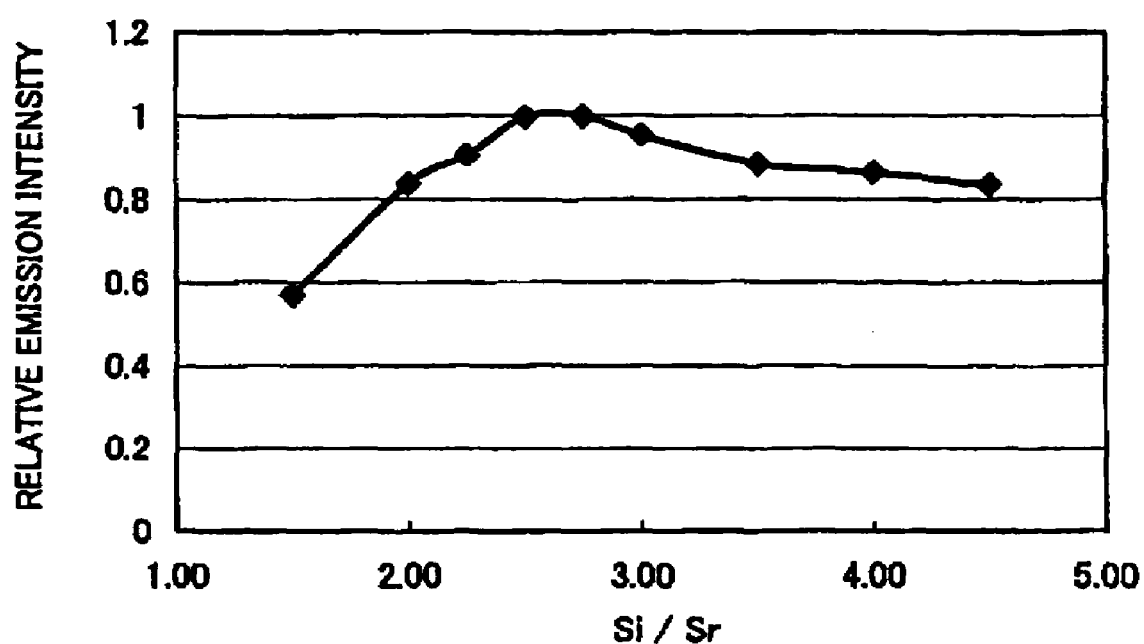
FIG. 11 is a graph showing the relation between Si/Sr ratio and the emission intensity, in the phosphor of the example 7.

The measurement result will be explained with reference to table 5 and FIG. 11. FIG. 11 is a graph showing the relative intensity of the emission intensity of the phosphor sample taken on the ordinate axis, and the value of the blending ratio Si/Sr taken on the abscissa axis. Note that in the emission intensity and luminance, the value of the emission intensity in the peak wavelength of Si/Sr=2.75 (sample 5) was defined as 100%. Then, the value of Si/Sr was adjusted up to 1.50 to 4.50, and the result is shown. Note that the light of 460 nm wavelength was used as the excitation light.

As clarified from the result of table 5 and FIG. 11, in the region where the value of Si/Sr was small, the emission intensity was increased as the value of Si/Sr was increased. However, the emission intensity was decreased as the value of Si/Sr was increased, with a peak at Si/Sr=2.75 (sample 5). This is because when the value of Si/Sr is Si/Sr=2.75 or more, in the same way as explained for the value of Al/Sr, the unreacted raw material remains in the phosphor after firing, the impurity phase is generated, and the crystallinity of the matrix structure is deteriorated due to the decrease in the X-ray diffraction peak intensity, resulting in the collapse of the structure suitable for light emission. However, if the deviation is small, the influence is also small, and 80% or more of the emission intensity and luminance of Si/Sr=2.75 can be exhibited when the value of Si/Sr satisfies 2.0<Si/Sr<4.0.

EXAMPLE 8

Change of Form of Raw Material

In the example 8, the change of the emission intensity and luminance was measured when the raw material of the element M of the example 1 was changed into oxide (here, SrO) in the phosphor sample expressed by the mixing composition formula $Sr_4AlSi_{11}O_4N_{15.7}$:Eu (Eu/(Sr+Eu)=0.030). Here, in the manufacture of the measurement sample, the phosphor sample was manufactured in the same way as the example 1, and the emission intensity and luminance was measured, excepting that an oxygen concentration was changed by mixing each raw material of SrO (3N), AlN (3N), $Si_3N_4$ (3N), $Eu_2O_3$ (3N) by a predetermined molar ratio.

The measurement result will be explained with reference to table 6. In the emission intensity and luminance, the value of the emission intensity in the peak wavelength of the sample (example 1), in which carbonate is used as the element M, was defined as 100%. Note that the light of 460 nm wavelength was used as the excitation light.

As clarified from the result of table 6, in regards to the emission intensity and luminance of each of the phosphors, it is found that the relative emission intensity is decreased by 30% when the oxide is used in the raw material of the element Sr. Oxygen and nitrogen concentrations are compared, between the phosphor of this example and the phosphor sample obtained in the example 1. The result is that the oxygen concentration is more increased and reversely the nitrogen concentration is more decreased in the aforementioned phosphor than those in the sample obtained in the example 1. This is because an oxide raw material is totally used as the raw material, and therefore flux effect is not exhibited, which is obtained when using the carbonate for example, thereby not sufficiently progressing the reaction, resulting in the generation of the impurity phase. Accordingly, as the raw material of the element M, by not using the oxide totally, but using the carbonate also, for example, the oxygen is sufficiently eliminated from a target product during reaction, thus preventing the impurity phase different from a

TABLE 5

|  |  | a/m | b/m | EMISSION WAVELENGTH (nm) | RELATIVE EMISSION INTENSITY (%) | CHROMATICITY | | LUMINANCE |
|---|---|---|---|---|---|---|---|---|
|  |  |  |  |  |  | x | y | Y (%) |
| EXAMPLE 7 | SAMPLE 1 | 0.25 | 1.50 | 642.2 | 57.0% | 0.634 | 0.357 | 54.3% |
|  | SAMPLE 2 | 0.25 | 2.00 | 637.9 | 83.8% | 0.640 | 0.355 | 78.2% |
|  | SAMPLE 3 | 0.25 | 2.25 | 638.0 | 90.5% | 0.641 | 0.354 | 86.5% |
|  | SAMPLE 4 | 0.25 | 2.50 | 637.0 | 99.8% | 0.641 | 0.355 | 94.4% |
|  | SAMPLE 5 | 0.25 | 2.75 | 637.0 | 100.0% | 0.639 | 0.356 | 100.0% |
|  | SAMPLE 6 | 0.25 | 3.00 | 635.3 | 95.5% | 0.639 | 0.356 | 90.0% |
|  | SAMPLE 7 | 0.25 | 3.50 | 635.4 | 88.5% | 0.638 | 0.356 | 86.4% |
|  | SAMPLE 8 | 0.25 | 4.00 | 633.8 | 86.4% | 0.637 | 0.357 | 85.4% |
|  | SAMPLE 9 | 0.25 | 4.50 | 633.4 | 83.4% | 0.636 | 0.357 | 82.8% | desired product phase from generating. This is preferable from the viewpoint of emission characteristics.

mixed as the element M, the emission peak was shifted toward the longer wavelength side, and it was found that a

TABLE 6

| | | a/m | b/m | EMISSION WAVELENGTH (nm) | RELATIVE EMISSION INTENSITY (%) | CHROMATICITY | | LUMINANCE | ANALYSIS RESULT | |
|---|---|---|---|---|---|---|---|---|---|---|
| | | | | | | x | y | Y (%) | O (wt %) | N (wt %) |
| EXAMPLE 1 | CARBONATE | 0.25 | 2.75 | 637.0 | 100.0% | 0.639 | 0.356 | 100.0% | 4.69 | 22.5 |
| EXAMPLE 8 | OXIDE | 0.25 | 2.75 | 641.4 | 66.1% | 0.629 | 0.361 | 66.3% | 7.20 | 21.2 |

EXAMPLE 9

Replacement of the Element M

In the example 9, the change of the emission intensity and luminance was measured when the raw material of the element M of the example 1 was changed into Ca and Ba, in the phosphor sample expressed by the mixing composition formula $Sr_4AlSi_{11}O_4N_{15.7}$:Eu (Eu/(Sr+Eu)=0.030). Here, in the manufacture of the measurement sample, by mixing each raw material $SrCO_3$ (3N), $CaCO_3$ (3N), $BaCO_3$ (3N), by a predetermined molar ratio, the composition of the element M in the composition formula was changed. When mixing more than one element, the molar ratio of the sum-total of the element M was adjusted and mixed to a constant value. The blending ratio of the element M thus adjusted was set to Ca (sample 1), Ca0.7:Sr0.3 (sample 2), Ca0.5:Sr0.5 (sample 3), Ca0.33:Sr0.66 (sample 4), Sr (sample 5), Sr0.5:Ba0.5 (sample 6), Ba (sample 7), and Ca0.5:Ba0.5 (sample 8). In the same way as the example 1, the phosphor sample was prepared and the emission intensity and luminance was measured.

The measurement result will be explained with reference to table 7. Note that in regards to the emission intensity and luminance, the value of the emission intensity and luminance in the peak wavelength of Sr sample (sample 5) as the element M was defined as 100%. The light of 460 nm wavelength was used as the excitation light.

When Sr is totally replaced with Ca as the element M, the emission wavelength was 611 nm, and a tendency of the emission peak to shift toward a short wavelength side was observed. The result was that the emission intensity and luminance had a decreasing tendency. When Sr and Ca were mixed as the element M, the emission peak was shifted toward the longer wavelength side, and it was found that a strongly reddish phosphor could be obtained. Further, when Sr and Ba were mixed as the element M, the tendency that the emission peak was shifted toward the longer wavelength side was observed. However, the light emission was not observed when the Ca and Ba were mixed as the element M, and when the element M was totally Ba.

TABLE 7

| | | Ca | Sr | Ba | EMISSION WAVELENGTH (nm) | RELATIVE EMISSION INTENSITY (%) | CHROMATICITY | | LUMINANCE |
|---|---|---|---|---|---|---|---|---|---|
| | | | | | | | x | y | Y (%) |
| EXAMPLE 9 | SAMPLE 1 | 1.00 | | | 611.4 | 13.7% | 0.553 | 0.420 | 28.4% |
| | SAMPLE 2 | 0.66 | 0.33 | | 653.2 | 32.2% | 0.630 | 0.353 | 29.0% |
| | SAMPLE 3 | 0.50 | 0.50 | | 650.5 | 48.3% | 0.636 | 0.352 | 44.0% |
| | SAMPLE 4 | 0.30 | 0.70 | | 643.0 | 78.1% | 0.643 | 0.351 | 71.3% |
| | SAMPLE 5 | | 1.00 | | 636.9 | 100.0% | 0.639 | 0.356 | 100.0% |
| | SAMPLE 6 | | 0.50 | 0.50 | 642.9 | 45.7% | 0.619 | 0.365 | 49.0% |
| | SAMPLE 7 | | | 1.00 | 発光しない | — | | | |
| | SAMPLE 8 | 0.50 | | 0.50 | 発光しない | — | | | |

EXAMPLE 10

Temperature Characteristics

In the example 10, by using the sample of the example 1 in the sample 1, by using the sample of the example 2 in the sample 2, by using the sample 3 of the example 9 in the sample 3, by using the sample 4 of the example 9 in the sample 4, by using the sample of the comparative example 1 in the sample 5, and by using the sample 4 of the comparative example 2 in the sample 6, the emission intensity of each sample at the temperature range from 25° C. to 200° C. was measured.

First, an emission intensity $P_T$ at temperature of T° C., and the change of the emission intensity will be explained. The aforementioned emission intensity $P_{25}$ is to measure the spectrum of the light emitted from an emitter, when the phosphor is placed in an environment of 25° C. and irradiated with an excitation light of the predetermined wavelength as will be described later. The peak having the maximum intensity in the measured spectrum is defined as the maximum peak, and the value of the relative intensity of the maximum peak is defined as $P_{25}$. Next, the temperature of the phosphor is increased from 25° C., and the phosphor is placed in the environment of T° C. and irradiated with the same excitation light as that emitted on measuring at 25° C., whereby the spectrum of the light emitted from the phosphor is measured. In the measured spectrum, the relative intensity of the peak corresponding to the peak defined as the maximum peak on measuring at 25° C. is obtained, and the value thus determined is defined as $P_T$.

From the $P_{25}$ and $P_T$ thus obtained, a rate of the change: $(P_{25}-P_T)/P_{25}\times100(\%)$ is calculated.

Although the wavelength of the irradiating excitation light may be any value, in the example 10, the light of 460 nm wavelength is used as the excitation light, which is an emission wavelength of a blue LED mainly used as the light emitting element for the white LED illumination. The result is shown in table 8.

As clarified from the result of the table 8, the emission intensity in each of the samples 1 to 6 has the tendency of decreasing, as the measurement temperature is increased. However, at the temperature of 100° C. or less which is close to the temperature of using an actual LED, absolute values of $(P_{25}-P_{100})/P_{25}\times100$ are all 10% or less, and it is confirmed that the phosphor of the example 10 maintains a high emission intensity even when placed in a state of high temperature.

As described above, the phosphor of the example 10 has a small deterioration in emission intensity and luminance of the phosphor, even when the temperature of the phosphor is increased due to heat generation of the light emission part. Accordingly, in the white LED prepared by using the phosphor of the present invention, even when the temperature is increased by introducing a large current to the LED, the high emission intensity and high luminance can be maintained and the light emission with less change of color tone can be obtained. Therefore it appears that the white LED illumination of the present invention is suitable for an illumination device.

sphere, with the temperature retained for 3 hours at 1800° C., and cooled from 1800° C. to 200° C. for 1 hour, whereby the phosphor expressed by the composition formula $Sr_4Al_5Si_{19}OoNn:Ce(n=33-2/3o)$ was obtained. The sample thus obtained was prepared by pulverizing and classifying.

2) Adjustment of the Phosphor Mixture

The emission spectrum was measured, when each phosphor of two kinds of the $Sr_4Al_5Si_{19}OoNn:Ce$ (n=33−2/3o) and the $Sr_4AlSi_{11}O_2N_{17}:Eu$ was excited with the excitation light of 460 nm wavelength, and a correlated mixing ratio, by which the correlated color temperature of the phosphor mixture was 5200K, was obtained from the emission spectrum by simulation. The result of the simulation was $(Sr_4Al_5Si_{19}OoNn:Ce):(Sr_4AlSi_{11}O_2N_{17}:Eu)=96.4:3.6$. Therefore, based on the result thus obtained, each phosphor was weighed and mixed to obtain the phosphor mixture.

However, by the emission wavelength of the light emission part (excitation wavelength of the phosphor mixture), and the emission efficiency of the phosphor by the emission wavelength, a preferable mixing ratio is sometimes deviated from the result of the simulation. In this case, the mixing ratio of the phosphor may be appropriately adjusted and an actual form of the emission spectrum may be adjusted.

3) Evaluation by Light Emitting Element

The LED having a nitride semiconductor and emitting blue light (of 460 nm wavelength) was set as the light emission part, and a mixture of the phosphor mixture and a resin was set

TABLE 8

| | | | | $(P_{25}-P_T)/P_{25}\times100$ (%) | | | |
|---|---|---|---|---|---|---|---|
| | | a/m | b/m | 25° C. | 50° C. | 100° C. | 150° C. | 200° C. |
| EXAMPLE 10 | SAMPLE 1 | 0.25 | 2.75 | 0.00 | −1.6% | −7.8% | −18.2% | −37.3% |
| | SAMPLE 2 | 0.25 | 2.50 | 0.00 | −0.9% | −7.0% | −15.0% | −31.2% |
| | SAMPLE 3 | 0.25 | 2.75 | 0.00 | −1.4% | −7.9% | −19.3% | −39.9% |
| | SAMPLE 4 | 0.25 | 2.75 | 0.00 | −2.1% | −7.1% | −16.5% | −36.0% |
| | SAMPLE 5 | 0.00 | 2.50 | 0.00 | −3.5% | −8.2% | −19.5% | −39.4% |
| | SAMPLE 6 | 1.00 | 1.50 | 0.00 | −7.0% | −23.3% | −44.9% | −67.5% |

EXAMPLE 11

In the example 11, a phosphor mixture, which emits the light of correlated color temperature of 5200K under the excitation light of 460 nm wavelength from the LED, was manufactured, and the emission characteristics and color rendering property of the phosphor mixture were evaluated. In the example 11, a green phosphor $Sr_4Al_5Si_{19}OoNn:Ce$ (n=33−2/3o) was used. However, the green phosphor having a garnet structure such as YAG:Ce, TAG:Ce, and $Ca_3Sc_2Si_3O_{12}:Ce$, or a sulfide phosphor such as $SrGa_2S_4:Eu$ may also be used.

1) Preparation of Phosphor

The red phosphor $Sr_4AlSi_{11}O_2N_{17}:Eu$ (phosphor of the example 1) was manufactured and prepared by the method explained in the embodiment. The green phosphor $Sr_4Al_5Si_{19}OoNn:Ce$ (n=33−2/3o) was manufactured by the method described below.

Figure 12:
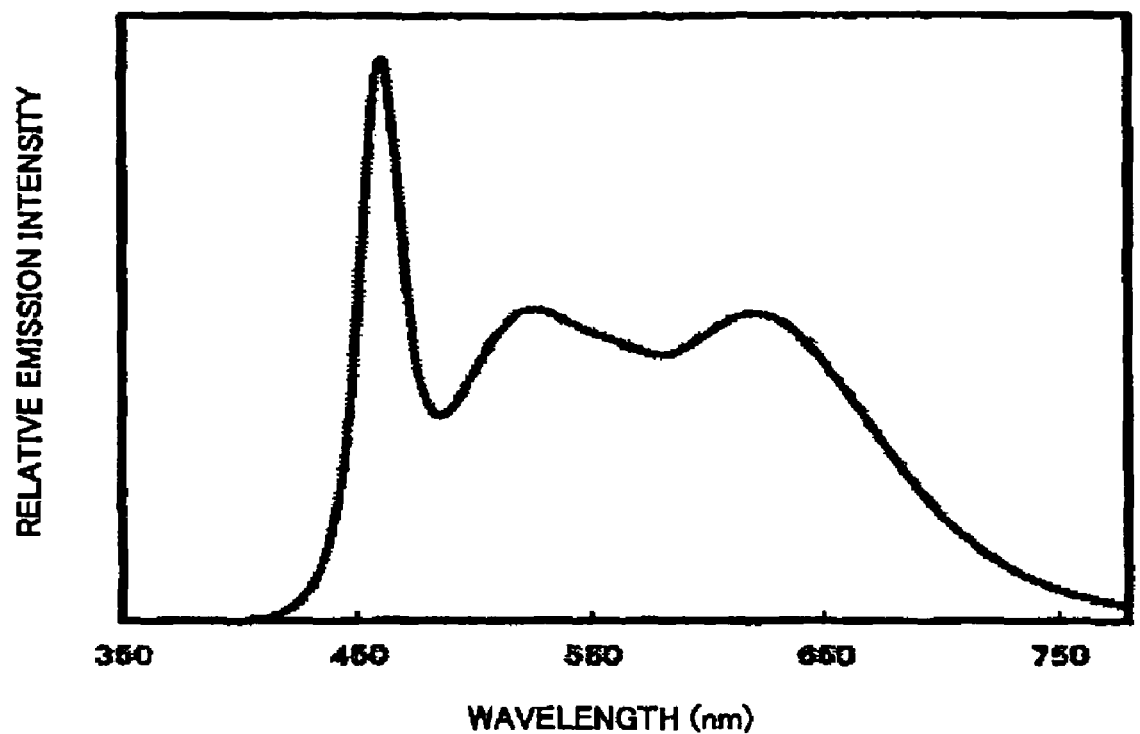
FIG. 12 is a graph showing the emission spectrum of a white LED lamp having the phosphor of the example 1.

The conventionally available $SrCO_3$ (2N), AlN (3N), $Si_3N_4$ (3N), and $CeO_2$ (3N) were prepared, and each raw material was weighed so that the molar ratio of each element became Sr:Al:Si:Ce=0.970:1.25:4.75:0.030, and mixed in the atmospheric air by using the mortar. The raw material thus mixed was then fired at the temperature increased at the rate of 15° C./min up to 1800° C. in a powdery state in a nitrogen atmoon the LED. The mixing ratio of the phosphor and the resin was adjusted so as to obtain daytime white colors corresponding to color temperature of 5200K, based on the result of the simulation, and by combining the LED and the light emission part by a publicly-known method, the white LED illumination (light emitting device) was prepared. As a result, the emission spectrum obtained by electrically energizing the light emitting element of the white LED illumination thus obtained with 20 mA current is shown in FIG. 12. FIG. 12 is a graph showing the relative emission intensity taken on the ordinate axis, and the emission wavelength (nm) taken on the abscissa axis.

The phosphor mixture emitted light under the excitation of the blue light emitted from the light emission part, and the white LED illumination releasing a white light having the emission spectrum with a broad peak in the wavelength range from 400 nm to 700 nm was obtained. Then, color temperature or color chromaticity was measured, to obtain 5207K, x=0.3399, y=0.3537. In addition, an average color rendering index (Ra) of the white LED illumination was 95, and a special color rendering coefficients R9 was 97, R14 was 99, and R15 was 94. Further, by properly changing the blending ratio of the phosphor to be mixed and a blending amount of the resin, the emission color of different color temperature could be obtained.

A list of measured data of the luminance, color chromaticity, color rendering index, and color temperature or the like is shown in Table 9.

TABLE 9

| | COLOR TEMPERATURE | CHROMATICITY | | AVERAGE COLOR RENDERING INDEX | COLOR RENDERING INDEX | | | | | | |
|---|---|---|---|---|---|---|---|---|---|---|---|
| | (K) | x | y | Ra | R9 | R10 | R11 | R12 | R13 | R14 | R15 |
| EXAMPLE 11 | 5207 | 0.3399 | 0.3537 | 95 | 97 | 93 | 100 | 74 | 96 | 99 | 94 |

What is claimed is:

1. A phosphor, which is given by a general composition formula expressed by MAaBbOoNn:Z,
where element M is at least one alkaline earth metal,
element A is Al, or Al and at least one Ga and In,
element B is Si or, Si and Ge,
element Z is a rare earth or transitional metal,
O is oxygen,
N is nitrogen, and
$0<a<2$, $2<b<4$, $0<o<1$, $n=2/3(1-o)+a+4/3b2/3o$,
wherein the phosphor is irradiated at 25° C. with a predetermined monochromatic light in a wavelength range from 300 nm to 550 nm as an excitation light, the value of the relative intensity of a maximum peak in an emission spectrum is defined as $P_{25}$, and when the phosphor is irradiated at 100° C. with the predetermined monochromatic light as the excitation light, the value of the relative intensity of the maximum peak is defined as $P_{100}$, the relation of $P_{25}$ and $P_{100}$ is given satisfying $(P_{25}-P_{100})/P_{25}\times 100\leq 10.0$.

2. A phosphor, which is given by a general composition formula expressed by MAaBbOoNn:Z,
where element M is at least one alkaline earth metal,
element A is Al, or Al and at least one Ga and In,
element B is Si or, Si and Ge,
element Z is a rare earth or transitional metal,
O is oxygen,
N is nitrogen, and
$0<a<2$, $2<b<4$, $0<o<1$, $n=2/3(1-o)+a+4/3b2/3o$, containing:
not less than 33.0 wt % and not more than 40.0 wt % of Sr;
not less than 1.0 wt % and not more than 6.0 wt % of Al;
not less than 25.0 wt % and not more than 31.0 wt % of Si;
not less than 0.5 wt % and not more than 6.0 wt % of O;
not less than 20.0 wt % and not more than 26.0 wt % of N; and
not less than 0.1 wt % and not more than 8.0 wt % of Eu,
wherein when the phosphor is irradiated with more than one kind of monochromatic light or continuous light in the wavelength range from 300 nm to 550 nm as the excitation light, the phosphor has the emission spectrum with a maximum peak wavelength in a range from 630 to 660 nm.

3. A phosphor, which is given by a general composition formula expressed by MAaBbOoNn:Z,
where element M is at least one alkaline earth metal,
element A is Al, or Al and at least one Ga and In,
element B is Si or, Si and Ge,
element Z is a rare earth or transitional metal,
O is oxygen,
N is nitrogen, and
$0<a<2$, $2<b<4$, $0<o<1$, $n=2/3(1-o)+a4/3b2/3o$,
which has an orthorhombic crystal structure.

4. A phosphor, which is given by a general composition formula expressed by MAaBbOoNn:Z,
where element M is at least one alkaline earth metal,
element A is Al, or Al and at least one Ga and In,
element B is Si or, Si and Ge,
element Z is a rare earth or transitional metal,
O is oxygen,
N is nitrogen, and
$0<a<2$, $2<b<4$, $0<o<1$, $n=2/3(1-o)+a+4/3b2/3o$,
which has an x-ray powder diffraction pattern by CoKα ray with two peaks from 42.0° to 43.1° of Bragg angle (2θ) among the diffraction peaks with 30% or more relative intensity with respect to the relative intensity of the maximum peak,
containing a primary particle with particle size of 20 μm or less and aggregates in which the primary particle agglutinates, wherein an average particle size (D50) of a powdery phosphor containing the primary particle and the aggregates is not less than 1.0 μm and not more than 20.9 μm,
wherein the aggregates of the primary particle contains a columnar particle.

5. A method of manufacturing the phosphor according to claim 1, wherein as raw materials, a compound of one kind or more elements selected from oxide, nitride, carbonate, hydroxide, and basic carbonate of the element M, a compound of one kind or more elements selected from oxide, nitride, carbonate, hydroxide, and basic carbonate of the element A, a compound of one kind or more elements selected from oxide, nitride, carbonate, hydroxide, and basic carbonate of the element B, and a compound of one kind or more elements selected from oxide, nitride, carbonate, hydroxide, and basic carbonate of the element Z are mixed to obtain the phosphor expressed by the general composition formula MAaBbOoNn:Z (where $0<a<2$, $2<b<4$, $0<o1$, $n=2/3(a-o)+a+4/3gb2/3o$), and by using a crucible composed of nitride as a firing crucible, the raw materials are fired at temperature of not less than 1600° C. and not more than 2000° C., in a state that 0.1 ml/min or more of gas containing 90% or more of nitrogen gas, and the balance being one or more gases selected from the group consisting of inert and reducing gases, is flown in a furnace.

6. The manufacturing method of the phosphor according to claim 5, wherein the raw material is fired by setting pressure inside furnace at 0.5 MPa or less.

7. The manufacturing method of the phosphor according to claim 5, wherein the crucible composed of nitride is a BN crucible.

8. The manufacturing method of the phosphor according to claim 5, wherein the raw material is fired in a powdery state.

9. The manufacturing method of the phosphor according to claim 5, wherein carbonate of the element M is used as the raw material of the element M.

10. A light emitting device, having the phosphor according to claim 1 and a light emission part for emitting light of a first wavelength, wherein the light with a wavelength different from the first wavelength is emitted from the phosphor with a part of or the whole part of the light of the first wavelength as an excitation light.

11. The light emitting device according to claim 10, wherein the first wavelength is the wavelength in a range from 300 nm to 550 nm.

12. The light emitting device according to claim 10, wherein the light emission part for emitting the light of the first wavelength is an LED.

13. A light emitting device, having the phosphor according to claim 2 and a light emission part for emitting light of a first wavelength, wherein the light with a wavelength different from the first wavelength is emitted from the phosphor with a part of or the whole part of the light of the first wavelength as an excitation light.

14. A light emitting device, having the phosphor according to claim 3 and a light emission part for emitting light of a first wavelength, wherein the light with a wavelength different from the first wavelength is emitted from the phosphor with a part of or the whole part of the light of the first wavelength as an excitation light.

15. A light emitting device, having the phosphor according to claim 4 and a light emission part for emitting light of a first wavelength, wherein the light with a wavelength different from the first wavelength is emitted from the phosphor with a part of or the whole part of the light of the first wavelength as an excitation light.

* * * * *